(12) United States Patent
Tsoungui

(10) Patent No.: US 11,288,288 B2
(45) Date of Patent: Mar. 29, 2022

(54) NESTED GROUP HIERARCHIES FOR ANALYTICS APPLICATIONS

(71) Applicant: Business Objects Software Ltd., Dublin (IE)

(72) Inventor: Olivier Tsoungui, Viry Chatillon (FR)

(73) Assignee: Business Objects Software Ltd., Dublin (IE)

( * ) Notice: Subject to any disclaimer, the term of this patent is extended or adjusted under 35 U.S.C. 154(b) by 0 days.

(21) Appl. No.: 16/897,722

(22) Filed: Jun. 10, 2020

(65) Prior Publication Data
US 2021/0390120 A1 Dec. 16, 2021

(51) Int. Cl.
*G06F 16/28* (2019.01)
*G06F 16/2457* (2019.01)
*G06F 16/27* (2019.01)

(52) U.S. Cl.
CPC ........... *G06F 16/282* (2019.01); *G06F 16/27* (2019.01); *G06F 16/284* (2019.01)

(58) Field of Classification Search
CPC ....... G06F 16/282; G06F 16/27; G06F 16/284
USPC ......................................................... 707/602
See application file for complete search history.

(56) References Cited

U.S. PATENT DOCUMENTS

| | | | | |
|---|---|---|---|---|
| 2005/0002375 A1* | 1/2005 | Gokhale | ............... | H04W 28/24 370/347 |
| 2012/0180033 A1* | 7/2012 | Brown | ...................... | G06F 8/20 717/168 |
| 2014/0040806 A1* | 2/2014 | Anderson | .............. | G06Q 10/06 715/771 |
| 2014/0075565 A1* | 3/2014 | Srinivasan | .......... | H04L 41/5054 726/26 |
| 2014/0317080 A1* | 10/2014 | Piraino | .................. | G16H 10/60 707/706 |

* cited by examiner

*Primary Examiner* — Kuen S Lu
(74) *Attorney, Agent, or Firm* — Schwegman Lundberg & Woessner, P.A.

(57) ABSTRACT

Techniques for implementing nested group hierarchies for analytics applications are disclosed. In some embodiments, a computer-implemented method comprises: creating a hierarchy object in a semantic layer based on a request comprising a definition for a nested group hierarchy, the definition specifying a hierarchical relationship structure for non-leaf group nodes and at least one leaf node, the non-leaf group nodes and the leaf node(s) corresponding to data stored in a data source in a non-hierarchical structure, the hierarchy object specifying the hierarchical relationship structure based on the definition; generating a query result based on a request comprising an indication of the hierarchy object using the hierarchy object from the semantic layer to retrieve the data from the data source; and causing the query result to be displayed on a computing device using the hierarchy object to display the retrieved data in a hierarchical format indicating the hierarchical relationship structure.

20 Claims, 13 Drawing Sheets

RESULT OBJECTS FOR QUERY #1 — 610

- SALES EMPLOYEE — 612
  - AMERICAN SALES REP. — 613
  - fx CHILDREN OF AMERICAN SALES REP. — 614
  - fx CHILDREN OF SOUTH AMERICAN SALES REP. — 615
  - 3 ITEMS

RESELLER SALES AMOUNT — 616    RESELLER ORDER QUANTITY — 617

620

| H1_MEMBER_DEPTH | H1_MEMBER_PARENT | H1_MEMBER_KEY | H1_MEMBER_CAPTION | RESELLER SALES AMOUNT | RESELLER ORDER QUANTITY |
|---|---|---|---|---|---|
| 2 | GRP_03 | GRP_04 | AMERICAN SALES REP. | 42992524,90 | 112274 |
| 3 | GRP_04 | GRP_05 | NORTH AMERICAN SALES REP. | 33456659,33 | 85510 |
| 3 | GRP_04 | GRP_06 | SOUTH AMERICAN SALES REP. | 9535865,57 | 26764 |
| 4 | GRP_05 | M284 | GARRETT R. VARGAS | 3609447,22 | 11544 |
| 4 | GRP_05 | M288 | JOSE EDVALDO SARAIVA | 5926418,36 | 15220 |

630

| SALES EMPLOYEE | RESELLER SALES AMOUNT | RESELLER ORDER QUANTITY |
|---|---|---|
| AMERICAN SALES REP. | 42992524,90 | 112274 |
| NORTH AMERICAN SALES REP. | 33456659,33 | 85510 |
| SOUTH AMERICAN SALES REP. | 9535865,57 | 26764 |
| GARRETT R. VARGAS | 3609447,22 | 11544 |
| JOSE EDVALDO SARAIVA | 5926418,36 | 15220 |

| RESULT OBJECTS FOR QUERY #1 |
|---|
| 612 ▶ |
| SALES EMPLOYEE — 813  ▭ RESELLER SALES AMOUNT — 616 |
| ƒx ALL MEMBERS FROM SALES EMPLOYEE |
| 3 ITEMS |

820

| SALES EMPLOYEE | RESELLER SALES AMOUNT |
|---|---|
| SALES | 61214930.39 |
| SALES MGR. | 1996726.75 |
| AMY E. ALBERTS | 732078.44 |
| STEPHEN Y. JIANG | 1092123.86 |
| SYED E. ABBAS | 172524.45 |
| SALES REP. | 59390728.09 |
| AMERICAN SALES REP. | 42992524.90 |
| NORTH AMERICAN SALES REP. | 33456659.33 |
| DAVID R. CAMPBELL | 3729945.35 |
| JILLIAN CARSON | 10065803.54 |
| LINDA C. MITCHELL | 10367007.43 |
| MICHAEL G. BLYTHE | 9293903.01 |
| SOUTH AMERICAN SALES REP. | 9535865.57 |
| GARRETT R. VARGAS | 3609447.22 |
| JOSE EDVALDO SARAIVA | 5926418.26 |
| EUROPEAN SALES REP | 14803867.81 |
| JAE B. PAK | 8503338.65 |
| RACHEL B. VALDEZ | 1790640.23 |
| RANJIT R. VARKEY CHUDUKATIL | 4509888.93 |
| OUTSIDE SALES REP. | 1594335.38 |
| SYED E. ABBAS | 172524.45 |
| LYNN N. TSOFLIAS | 1421810.93 |
| OTHERS | 19235666.59 |
| PAMELA O. ANSMAN-WOLFE | 3325102.60 |
| SHU K. ITO | 6427005.56 |
| TETE A. MENSA-ANNAN | 2312545.69 |
| TSVI MICHAEL. REITER | 7171012.75 |

*FIG. 8*

NESTED GROUP HIERARCHIES FOR ANALYTICS APPLICATIONS

TECHNICAL FIELD

The present application relates generally to the technical field of electrical computer systems, and, in various embodiments, to systems and methods of implementing nested group hierarchies for software analytics applications.

BACKGROUND

Many data sources, such as relational databases, that store data used by analytics applications do not support the effective and efficient creation of hierarchies for the stored data by end users. As a result, the analytics applications are less effective and efficient in performing their analytics functions. Current solutions of having a database administrator specially configure a data source to include hierarchies do not allow for dynamic creation of hierarchies by end users. Additionally, solutions that involve the configuration of the database itself result in the consumption of storage space in the database by the storage of hierarchical relationship data, thereby overburdening the database and resulting in less efficient data retrieval. The present disclosure addresses these and other technical problems.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 6 illustrates a query panel, a table of corresponding hierarchy column properties for the hierarchy object, and a query result generated using the hierarchy object, in accordance with some example embodiments.

FIG. 8 illustrates a query panel and a query result generated using a hierarchy object, in accordance with some example embodiments.

DETAILED DESCRIPTION

Example methods and systems for implementing nested group hierarchies for software analytics applications are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is configured to create a hierarchy object in a semantic layer of an application platform based on a request comprising a definition for a nested group hierarchy. The definition may specify a hierarchical relationship structure for non-leaf group nodes and at least one leaf node, with the non-leaf group nodes and the leaf node(s) corresponding to data stored in a data source in a non-hierarchical structure, and the hierarchy object may specify the hierarchical relationship structure based on the definition. The computer system is also configured to generate a query result based on a request comprising an indication of the hierarchy object using the hierarchy object from the semantic layer to retrieve the data from the data source, and then cause the query result to be displayed on a computing device using the hierarchy object to display the retrieved data in a hierarchical format indicating the hierarchical relationship structure. As a result of the features disclosed herein, the functioning of the computer system is improved, as the computer system enables end users to dynamically create hierarchies rather than rely on database configuration by an administrator, and the computer system supports these hierarchies without consuming storage space in a database layer. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
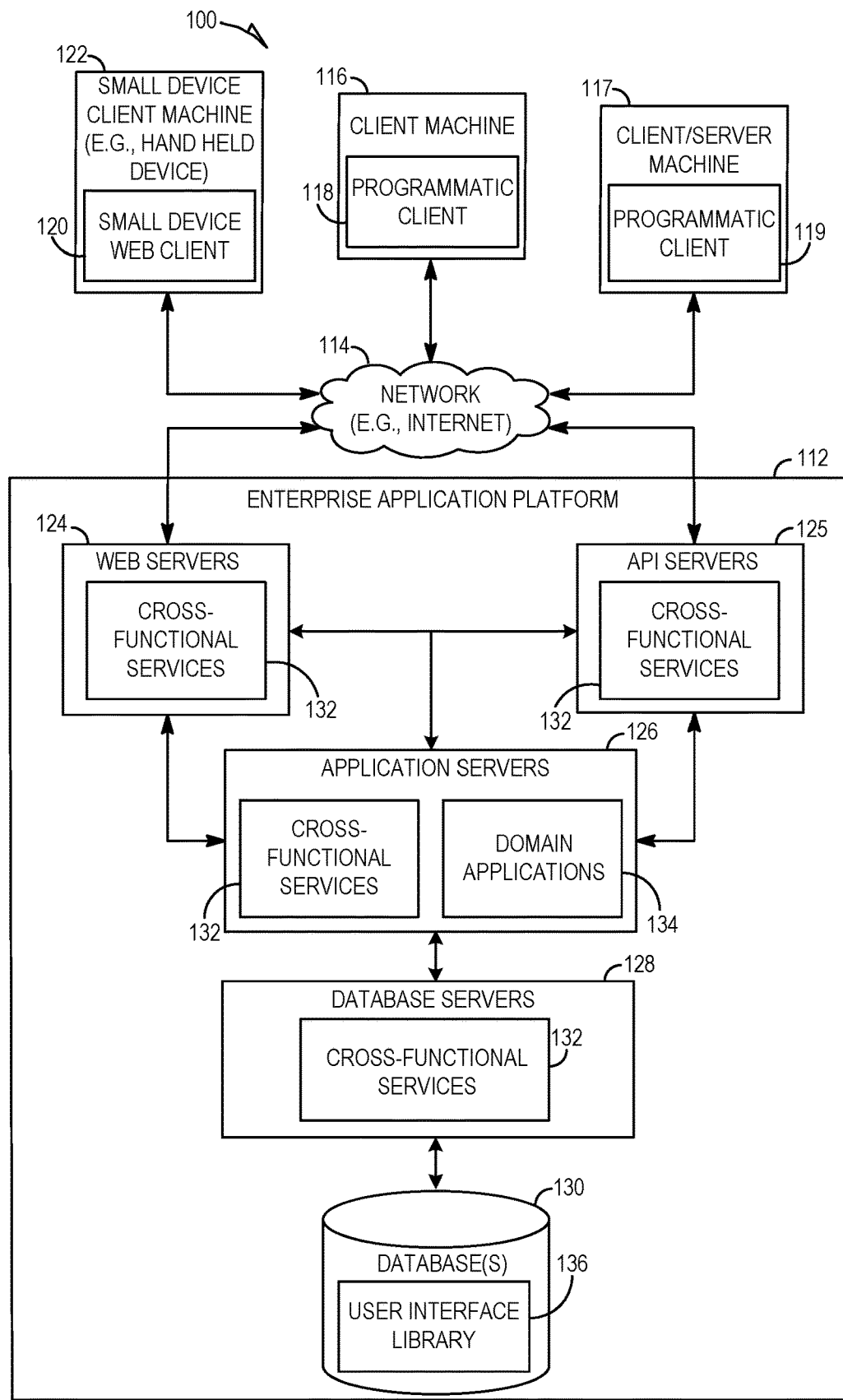
FIG. 1 is a network diagram illustrating a system, in accordance with some example embodiments.

FIG. 1 is a network diagram illustrating a system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-12.

Figure 2:
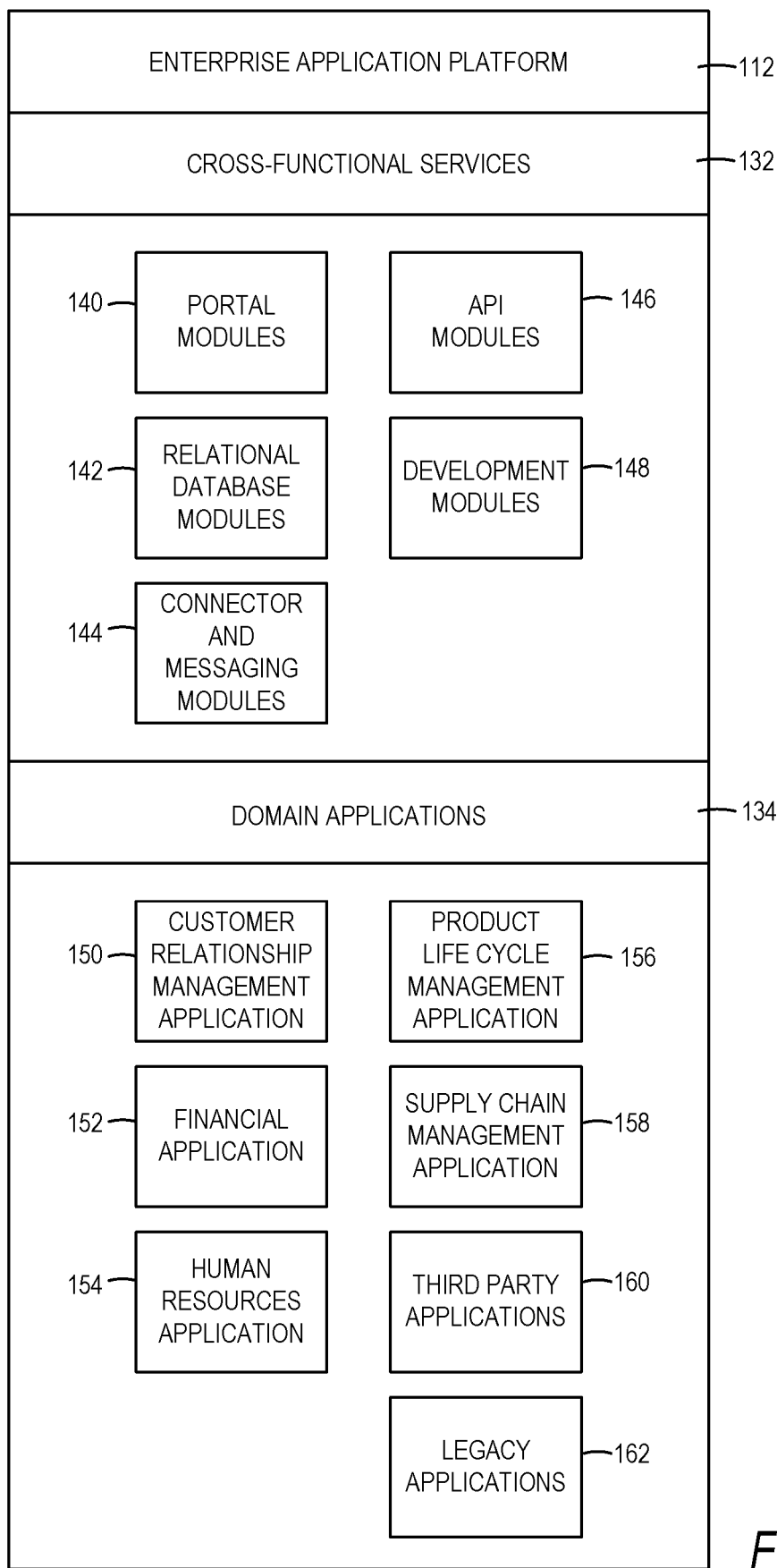
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
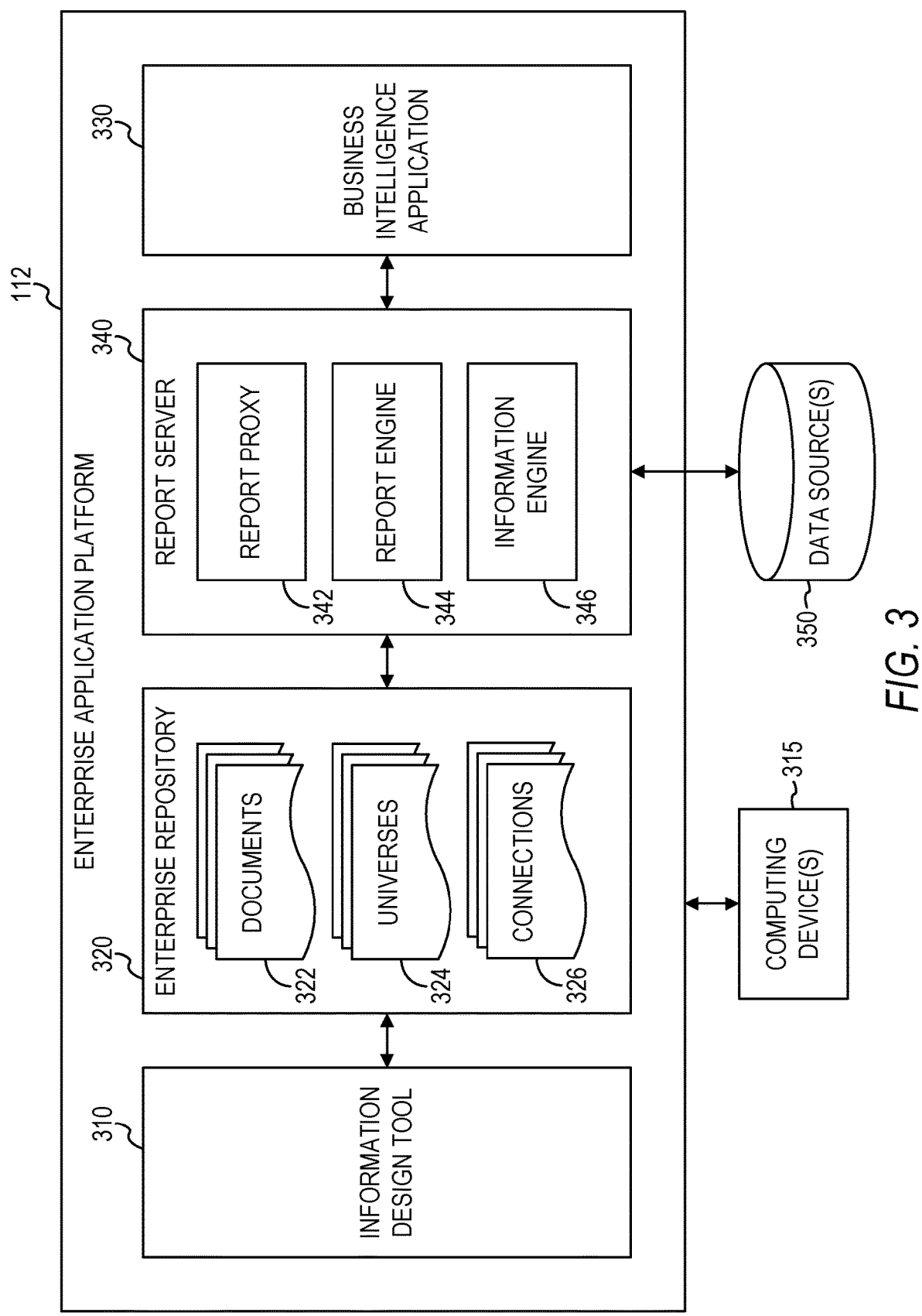
FIG. 3 is a block diagram illustrating components of the enterprise application platform, in accordance with some example embodiments.

FIG. 3 is a block diagram illustrating components of the enterprise application platform 112, in accordance with some example embodiments. In some example embodiments, the enterprise application platform 112 comprises any combination of one or more of an information design tool 310, an enterprise repository 320, one or more business intelligence applications 330, and a report server 340. The information design tool 310, the enterprise repository 320, the business intelligence application 330, and the report server 340 can reside on a computer system, or other machine, having a memory and at least one processor (not shown).

In some example embodiments, one or more of the information design tool 310, the enterprise repository 320, the business intelligence application 330, and the report server 340 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input.

In some example embodiments, the information design tool 310, the enterprise repository 320, the business intelligence application 330, and the report server 340 are configured to receive user input. For example, the information design tool 310, the enterprise repository 320, the business intelligence application 330, and the report server 340 can present one or more graphical user interface (GUI) elements (e.g., drop-down menu, selectable buttons, text field) with which a user can submit input. In some example embodiments, the information design tool 310, the enterprise repository 320, the business intelligence application 330, and the report server 340 are configured to perform various communication functions to facilitate the functionality described herein, such as by communicating with a computing device 315 (e.g., the small device client machine 122, the client machine 116, or the client/server machine 117) via the network 114 using a wired or wireless connection, as well as by communicating with one or more data sources 350.

In some example embodiments, the information design tool 310 is configured to enable a user to create nested group hierarchies for data stored in the data source(s) 350. The data source(s) 350 may comprise a relational database or an online analytical processing (OLAP) cube comprising a multi-dimensional array of data. Other types of data sources 350 are also within the scope of the present disclosure. The data stored in the data source(s) 350 is not stored in a hierarchical structure, but rather is stored in a non-hierarchical structure.

The information design tool 310 may be configured to extract data from the data source(s) 350 using a data source connection to create universes 324. The universes 324 are logical collections of dimensions and objects that allow users to analyze data. Objects and dimension represent different hierarchies, measures, custom calculations, and attributes. Each universe 324 functions as a semantic layer and can be situated between the technical-oriented data source 350 and end users. This semantic layer takes care of the translation of tables and columns to meaningful terms in such a way that end users do not need to know any query language. The semantic layer contains metadata about the table columns and their relationships within the underlying data source(s) 350. This semantic layer is presented in a universe 324 by the use of classes and objects. The universe may be designed with the information design tool 310. The universes 324 created using the information design tool 310 can be used with different reporting tools of the business intelligence application 330. The universes 324 may be published to the enterprise repository 320 for use by the business intelligence application 330, such as in reporting and dashboard tools.

In some example embodiments, the business intelligence application 330 is configured to perform analytics functions, including, but not limited to, reporting, online analytical processing, analytics, data mining, process mining, complex event processing, business performance management, benchmarking, text mining, predictive analytics, and prescriptive analytics. The business intelligence application 330 may allow for the easy interpretation of big data.

The business intelligence application 330 may be configured to enable users to regroup dimension values stored in the data source(s) 350 under custom groups within reports for a better data analysis (e.g., to group months into quarters). For users, grouping data is very helpful because it offers a simple way to generate data and metadata to reorganize corporate data inside reports without needing professional information technology services. However, for most users, this feature remains quite basic for extended use cases because these custom groups are not dynamic ones, they are not shareable through applications, and they do not include multidimensional analysis concepts with features such as hierarchical navigation, fold/unfold with level totals, or drill-through in report data. The enterprise application platform 112 is configured to enable users to structure data into custom groups that may be dynamic, hierarchical, and shared through universes or documents.

The enterprise application platform 112 is configured to provide a variety of features, including, but not limited to, the ability to create custom groups inside universes 324 to favor their sharing through the business intelligence application 330, the ability to execute these custom groups on all data sources 350 supported by the universes 324, the ability to define custom groups in which memberships are determined using one or more search expressions in universes 324 or documents 322, and the introduction of nested groups to offer a great amount of flexibility in the hierarchical grouping of data at the level of universes 324 and documents 322. A nested group is a group that references other group entries, which can be static, dynamic, or other nested groups.

In some example embodiments, the enterprise application platform 112 is configured to create nested group hierarchies without adding new metadata at the database level by storing all metadata required for transformations and computations in a semantic layer of the enterprise application platform 112, such as in the universe 324 itself. As with common universe objects (e.g., dimensions, measures, attributes, filters, etc.), these nested group hierarchies can be saved in the universe 324 for future use in the business intelligence application 330. At consumption, business intelligence application 330 may consume the nested group hierarchies in reports in using them in query panels, such as through hierarchical member selections or query filters. In some example embodiments, the enterprise application platform 112 is configured to execute queries on static, dynamic, and nested group memberships defined in the nested group hierarchies. The enterprise application platform 112 may also support the full rollup for measures into the nested group hierarchies, meaning that the group member's total can be calculated in including contributions from the children that are not visible in the final report.

In querying data sources 350 that comprise relational databases, the enterprise application platform 112 may use standard SQL clauses such as UNION operators, and SQL extensions such as COMMON TABLE EXPRESSIONS (CTE). In querying OLAP Multidimensional Expressions (MDX) databases, the enterprise application platform 112 may combine MDX queries and local data processing. These technical details of the data source queries are hidden by the universe semantic layer that provide a common, simple, easy-to-use interface for the business intelligence application 330 and users of the business intelligence application 330.

In FIG. 3, a user can use the information design tool 310 to browse universes 324 in which the user wants to create or insert new nested group hierarchies for reporting/analysis requirements, such as via one or more user interface elements of the information design tool 310 displayed on the computing device 315. Once the user has selected a universe 324 from the enterprise repository 320, the user creates and inserts one or more new nested group hierarchies in the universe 324 using the information design tool 310. After the nested group hierarchies are created and inserted in the universe 324, the user can share them in publishing the universe 324 to the enterprise repository 320, thereby making the nested group hierarchies accessible for use by the business intelligence application 330. Using the business intelligence application 330, the user may also create new nested group hierarchies inside documents 322. Once the new nested group hierarchies are created inside the documents 322, the user can share them in publishing the document 322 to the enterprise repository 320. The business intelligence application 330 may communicate with the enterprise repository 320 via a report proxy 342 of the report server 340. The business intelligence application 330 may access nested group hierarchies available in universes 324 created using the information design tool 310 or in documents 322 created using the business intelligence application 330 in order to create reports.

A user can use the nested group hierarchies to create a report, such as by using the hierarchies in a query panel to define query specifications, including hierarchy member selections and query filters on the hierarchies. At runtime, these query specifications may be transmitted to an information engine 346 of the report server 340 for treatment. For example, the information engine 346 may first load the universe 324 from the enterprise repository 320 (or cache) in order to get the definition of the hierarchies, as well as the data connection type from stored connection data 326, and then, based on the connection type, generate a native query script according to the query specification that will be executed to the data source(s) 350 in order to retrieve query result sets. In some cases, a local processing can be performed to complete the actions. Once the query result sets are retrieved by the information engine 346, the data may be formatted according to user settings and displayed on the computing device 315 of the user of the business intelligence application 330. The metadata definition for hierarchies used in the query may also be transmitted to a report engine 344 of the report server 340 for reporting workflows (e.g., collapse/expand, fold/unfold, hierarchical formulas, etc.). When the user uses nested group hierarchies created inside documents 322 in order to create a report, data computation and transformation may be performed by the report engine 344 from local data available in the document source.

In some example embodiments, the enterprise application platform 112 is configured to create a nested group hierarchy inside a universe 324. In the universe 324, the nested group hierarchy is a business object that can be used to create ad-hoc queries on data sources 350 for reporting. A business object is an entity within a multitiered software application that works in conjunction with the data access and business logic layers to transport data. In one example, a "Manager" is a business object where its attributes can be "First Name," "Last Name," "Age," "Area," and "Country," and it could hold a 1-$n$ association with its employees (e.g., a collection of Employee instances). Whereas a program may implement classes, which typically end in objects managing or executing behaviors, a business object may do nothing itself, but holds a set of instance variables or properties, also known as attributes, and associations with other business objects, weaving a map of objects representing the business relationships. Business objects separate state from behavior because they are communicated across the tiers in a multitiered system, while the real work of the application is done in the business tier and does not move across the tiers.

In some example embodiments, the enterprise application platform 112 is configured to receive a request to create a nested group hierarchy in a data universe 324 from the computing device 315 of a user. The request may comprise a definition for the nested group hierarchy, where the definition specifies a hierarchical relationship structure for a plurality of non-leaf group nodes and at least one leaf node. The plurality of non-leaf group nodes and the leaf node(s) may correspond to data stored in the data source 350 in a non-hierarchical structure. In some example embodiments, the definition comprises at least one static member selection corresponding to the leaf node(s), where the static member selection identifies at least one specific member of one of the plurality of non-leaf group nodes. Additionally or alternatively, the definition may comprise at least one dynamic member selection corresponding to the leaf node(s), where the at least one dynamic member selection specifies at least one search criteria for identifying at least one specific member of one of the plurality of non-leaf group nodes. Examples of static member selections and dynamic member selections are provided in FIG. 4.

Figure 4:
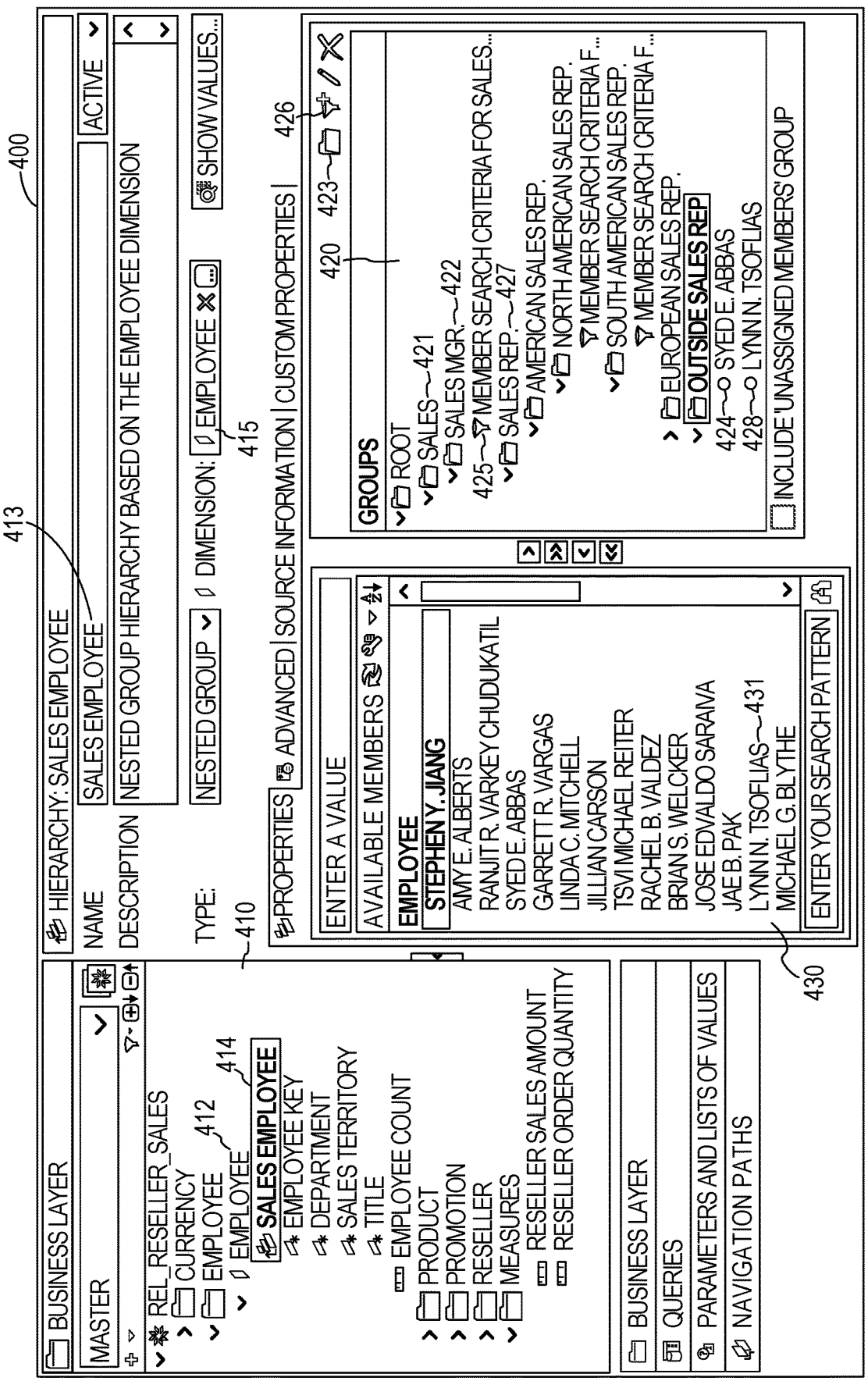
FIG. 4 illustrates a graphical user interface (GUI) configured to enable a user to create a hierarchy object, in accordance with some example embodiments.

FIG. 4 illustrates a graphical user interface (GUI) 400 configured to enable a user to create a hierarchy object, in accordance with some example embodiments. The GUI 400 includes a panel 410 showing elements of a universe 324. To create a nested group hierarchy inside the universe 324, the enterprise application platform 112 may enable the user to select a dimension already available in the universe 324, such as via the GUI 400. For example, the user may select the dimension using a corresponding user interface element 412 in the panel or another corresponding user interface element 415. The user may also use the GUI 400 to select a hierarchy for creation. The hierarchy may be represented in the panel 410 by a corresponding user interface element 414. The hierarchy may also be identified by corresponding text 413 in a text field dedicated to a name or identification of the hierarchy.

In the example shown in FIG. 4, a hierarchy labeled "Sales Employee" is created from a dimension labeled "Employee" in order to reorganize employees contributing to sales. This "Sales Employee" hierarchy comprises nested groups described in the table below:

| Group name | Key |
|---|---|
| [−] Sales | GRP_01 |
|   [+] Sales Mgr. | GRP_02 |
|   [−] Sales Rep. | GRP_03 |
|     [−] American Sales Rep. | GRP_04 |
|       [+] North American Sales Rep. | GRP_05 |
|       [+] South American Sales Rep. | GRP_06 |
|     [+] European Sales Rep. | GRP_07 |
|     [+] Outside Sales Rep. | GRP_08 |
| [+] Others | GRP_NA |

In FIG. 4, the GUI 400 includes a panel 420 for creating and organizing hierarchy components. To create the "Sales Employee" hierarchy with the nested groups above in the universe 324, the user first adds "Sales" group to the hierarchy, such as by clicking on a user interface element 423, thereby generating a representation 421 of the "Sales" group in the panel 420. Then, in FIG. 4, the user adds two new child groups, "Sales Mgr." and "Sales Rep.," to the hierarchy under the "Sales" group representation 421, such as by clicking on the user interface element 423, thereby generating corresponding representations 422 and 427 of the two child groups in the panel 420. The same user actions are repeated to insert other child groups, such as "American Sales Rep.," "European Sales Rep.," and "Outside Sales Rep." under the "Sales Rep." group, as well as the child groups "North American Sales Rep." and "South American Sales Rep." under the "American Sales Rep." group.

To insert dimension members into groups, the enterprise application platform 112 may provide the user with two modes of member selection: static member selection and dynamic member selection. In static member selection, the user can individually select members or other groups the user wants to include in a given group. For the static selections, their selection can be done from a list of values or by typing a member identification manually. For example, the user may select a user interface element 431 corresponding to a member or group from a list of members or groups displayed in a panel 430 of the GUI 400, and then select one or more user interface elements to add the corresponding member or group of the selected user interface element 431 to a specific group in the panel 420. In the example shown in FIG. 4, the user has used static member selection to select user interface elements 431 corresponding to "Syed E. Abbas" and "Lynn N. Tsoflias" from panel 430 to be added to the "Outside Sales Rep." group in panel 420, resulting in respective representations 424 and 428 of "Syed E. Abbas" and "Lynn N. Tsoflias" being added to the "Outside Sales Rep." group in panel 420.

In dynamic member selection, the user defines search criteria to implicitly select members in a given group. To insert search criteria in a group, the user may select the group in panel 420 and click on a corresponding user interface element 426 (e.g., a selectable icon or a "CONDI-TION" button). For example, in FIG. 4, the user has selected the "Sales Mgr." group, the "North American Sales Rep." group, and the "South American Sales Rep." group from panel 420 in separate respective instances, and selected the user interface element 426 to define search criteria for dynamic member creation for each of the selected groups, resulting in a representation 425 of each member added to a group using dynamic member creation being displayed in the panel under the corresponding group. The search criteria can be defined on the dimension itself or on attributes of the dimension (e.g., the "Employee" dimension may have attributes such as Title, Department, Sales Territory, Gender, etc.). The table below provides one example of how members (or other groups) are defined and selected for each group listed above:

| Group name | Selected members (or other groups) | Node type |
|---|---|---|
| Sales | Include 'Sales Mgr.' group | group |
|  | Include 'Sales Rep.' group | group |
| Sales Mgr. | Include If Department = 'Sales' AND Title = 'Manager' | condition |
| Sales Rep. | Include 'American Sales Rep.' group | group |
|  | Include 'European Sales Rep.' group | group |
|  | Include 'Other Sales Rep.' group | group |
| American Sales Rep. | Include 'North American Sales Rep.' group | group |
|  | Include 'South American Sales Rep.' group | group |
| North American Sales Rep. | Include If Department = 'Sales' AND Title <> 'Manager' AND SalesTerritory = 'North America' | condition |
| South American Sales Rep. | Include If Department = 'Sales' AND Title <> 'Manager' AND SalesTerritory = 'South America' | condition |
| European Sales Rep. | Include If Department = 'Sales' AND Title <> 'Manager' AND SalesTerritory = 'Europe' | condition |
| Outside Sales Rep. | Include 'Syed E. Abbas' member | member |
|  | Include 'Lynn N. Tsoflias' member | member |
| Others | Include unassigned members | condition |

A group may comprise members, as well as other groups. A dimension member can be used in multiple groups within the nested group hierarchy. When the nested group hierarchy is saved in a universe 324 that is published in the enterprise repository 320, the nested group hierarchy can then be shared and used by many documents 322 and by various business intelligence applications 330.

In some example embodiments, the enterprise application platform 112 is also configured to create nested group hierarchies inside a document 322. For example, the same hierarchy creation features used via the information design tool 310, as discussed above, may also be used via the business intelligence application 330, such as when the user is using the business intelligence application 330 to create and review documents 322.

Figure 5:
FIG. 5 illustrates another GUI configured to enable a user to create a hierarchy object, in accordance with some example embodiments.

FIG. 5 illustrates another GUI 500 configured to enable a user to create a hierarchy object, in accordance with some example embodiments. In FIG. 5, the GUI 500 is used by the user to create nested group hierarchies when the user is using the business intelligence application 330 to create or review documents 322. In the business intelligence application 330, when a nested group hierarchy is saved in a document 322 that is published in the enterprise repository 320, the nested group hierarchy can then be shared and re-used by many other documents 322 through features of the business intelligence application 330.

The hierarchy may be identified by corresponding text 513 in a text field dedicated to a name or identification of the hierarchy. In some example embodiments, in creating the hierarchy within documents 322, the user can only select dimensions or variables available in the documents 322, such as by selecting a dimension or variable via a selectable user interface element 515. In FIG. 5, to create the "Sales Employee" hierarchy with the nested groups, the user first adds "Sales" group to the hierarchy, such as by clicking on a user interface element 523, thereby generating a representation 521 of the "Sales" group. Then, in FIG. 5, the user adds two new child groups labeled "Sales Mgr." and "Sales Rep." to the hierarchy under the "Sales" group representation 521, such as by clicking on the user interface element 523, thereby generating corresponding representations 522 and 527 of the two child groups in the GUI 500. The same user actions are repeated to insert others child groups.

To insert dimension members into groups, the enterprise application platform 112 may provide the user with two modes of member selection: static member selection and dynamic member selection. In static member selection, the user can individually select members or other groups the user wants to include in a given group. For the static selections, their selection can be done from a list of values or by typing a member identification manually. For example, the user may select a user interface element 531 corresponding to a member or group from a list of members or groups displayed in the GUI 500, and then select one or more user interface elements to add the corresponding member or group of the selected user interface element 531 to a specific group.

In dynamic member selection, the user defines search criteria to implicitly select members in a given group. To insert search criteria in a group, the user may select the group and click on a corresponding user interface element 526 (e.g., a selectable icon or a "CONDITION" button). For example, in FIG. 5, the user has selected the "North American Sales Rep." group and also selected the user interface element 526 to define search criteria for dynamic member creation for the selected "North American Sales Rep." group, resulting in a representation 525 of each member added to a group using dynamic member creation being displayed in the panel under the corresponding group. The search criteria can be defined on the dimension itself or on attributes of the dimension (e.g., the "Employee" dimension may have attributes such as Title, Department, Sales Territory, Gender, etc.).

In some example embodiments, the enterprise application platform 112 creates a hierarchy object in a semantic layer of the enterprise application platform 112 based on the request by the user to create the nested group hierarchy. The hierarchy object may specify the hierarchical relationship structure for the plurality of non-leaf group nodes and the leaf node(s) based on the definition included in the request. The enterprise application platform 112 may then receive a request from another computing device 315 of another user to query the data source 350. The request to query the data source 350 may comprise an indication of the hierarchy object, such as text that identifies the hierarchy object. In some example embodiments, the enterprise application platform 112 generates a query result based on the query request using the hierarchy object from the semantic layer of the enterprise application platform 112 to retrieve the data from the data source 350. The enterprise application platform 112 may then cause the query result to be displayed on the other computing device 315 using the hierarchy object. In some example embodiments, the retrieved data is displayed in a hierarchical format indicating the hierarchical relationship structure based on the hierarchy object.

The nested group hierarchies created in universes 324 can be used in query panels to create ad-hoc queries for reporting. In the query panel, the nested group hierarchies can be used as result objects or to create query filters. When running a query containing a universe hierarchy used as result object in the query panel, the information engine 346 may replace the hierarchy column by four default hierarchy column properties in the query result. These hierarchy column properties are described as following:

| Hierarchy column property | Description |
| --- | --- |
| MEMBER_CAPTION | Mandatory. This hierarchy column property provides the display name of hierarchy members. |
| MEMBER_PARENT | Mandatory. This hierarchy column property provides the parent member of hierarchy members. |
| MEMBER_KEY | Optional. This hierarchy column property provides the key of hierarchy members. This column property is only available if the Nested Group hierarchy is based on a dimension providing member keys |
| MEMBER_DEPTH | Optional. This hierarchy column property provides the distance of hierarchy members from the root, which is zero. |

The MEMBER_PARENT with MEMBER_KEY (when available) or MEMBER_CAPTION column properties are used by the semantic layer to hierarchize hierarchical data after executing the query to the data source 350. The combination of these column properties is used to determine the parent-child relationships between hierarchy members, and to re-build the hierarchy in reports. The MEMBER_DEPTH column property is not necessary for hierarchizing data. However, when available, it is used to increase the performance in the hierarchizing algorithms.

FIG. 6 illustrates a query panel 610 in which a hierarchy object 612 is indicated, a table 620 of corresponding hierarchy column properties for the hierarchy object 612, and a query result 630 generated using the hierarchy object 612, in accordance with some example embodiments. The query panel 610 is configured to enable the user to select the hierarchy object 612, as well as hierarchy member selections for the hierarchy object 612, such as hierarchy member selections 613, 614, and 615. Additionally, the user may also select one or more measures for which the user is requesting values be returned as a result, such as measures 616 and 617. As seen in FIG. 6, the query result 630 comprises the values for the measures 616 and 617 for the hierarchy object 612 using the hierarchy member selections 613, 614, and 615.

In some example embodiments, the semantic layer of the enterprise application platform 112 generates SQL query scripts on the top of the hierarchies used in the query panel 610 according to the query specifications. When running a query having a hierarchy as result object 612 (without using the hierarchy member selection) in the query panel 610, the semantic layer returns by default only group nodes with their totals in the final query result 630. However, in enabling a Select All Members option on the hierarchy object 612 in the query panel 610, the semantic layer will return all hierarchy members (including the group nodes with their totals) in the final query result 630.

To run a query with hierarchies used as result objects, the semantic layer may generate by default one SQL SELECT statement per group in order to retrieve and display totals for each group in the final report. Each SELECT statement is conditioned by the members selected in the group, and then combined with other groups using the UNION ALL operator for the final report. However, this approach has a couple of drawbacks. First, the performance is not very good if the query contains multiple hierarchies with several various groups. Second, the SQL script can become very verbose or even unreadable when many combinations are generated to get totals for each group combination. In order to address these problems, when supported by the databases, the enterprise application platform 112 may use common table expressions (CTE) to generate SQL queries on hierarchies used as result objects. In such a solution, the CTE creates hierarchy views in the SQL according to the definition of hierarchies in the universe 324. Once generated, these CTE hierarchy views are then joined to their associated dimension tables in order to execute the final queries for reporting.

One challenge is being able to compute cell totals through the hierarchy depths. Let's consider that we want to display the total of Sales Amount for the North American Sales Rep. and South American Sales Rep. groups, as well as for their direct children too. The table below describes an extract of the CTE hierarchy view generated from the Sales Employee hierarchy:

| IS_LEAF | PARENT_NODE | NODE | NODE_NAME |
|---|---|---|---|
| 0 | GRP_04 | GRP_05 | [−] North American Sales Rep. |
| 1 | GRP_05 | M289 | David R. Campbell |
| 1 | GRP_05 | M283 | Jillian Carson |
| 1 | GRP_05 | M282 | Linda C. Mitchell |
| 1 | GRP_05 | M281 | Michael G. Blythe |
| 0 | GRP_04 | GRP_06 | [−] South American Sales Rep. |
| 1 | GRP_06 | M284 | Garrett R. Vargas |
| 1 | GRP_06 | M288 | José Edvaldo Saraiva |

Here, the IS_LEAF column indicates if the node type is a group (0) or a member (1). If we want to compute the total sales amount for the North American Sales Rep. group, we need to add in the sales amount of all its distinct child members, regardless of depth. Idem for the South American Sales Rep. group. Usually the semantic layer generates an SQL GROUP BY statement to compute these totals. However, there is no generally available SQL construct that can traverse hierarchies. So, the challenge is to generate a SQL query that computes cell totals from all nested groups displayed in reports.

In order to address this problem, the enterprise application platform 112 may enhance the data so that the semantic layer is able to retrieve the information it needs using standard SQL. For this purpose, the semantic layer may enrich the generated CTE hierarchy view with records for every employee/group relationship, regardless of depth. For instance, if users want to query the cell totals for the North American Sales Rep. and South American Sales Rep. groups, the semantic layer may generate a CTE hierarchy view that contains their employee/group relationships as described in the table below:

| CTE_HIERARCHY_VIEW | | | | |
|---|---|---|---|---|
| IS_LEAF | PARENT_NODE | NODE | CHILDREN | |
| 0 | GRP_04 | GRP_05 | M289 | North American SR's children |
| 0 | GRP_04 | GRP_05 | M283 | North American SR's children |
| 0 | GRP_04 | GRP_05 | M282 | North American SR's children |
| 0 | GRP_04 | GRP_05 | M281 | North American SR's children |
| 1 | GRP_05 | M289 | M289 | Leaf |
| 1 | GRP_05 | M283 | M283 | Leaf |
| 1 | GRP_05 | M282 | M282 | Leaf |
| 1 | GRP_05 | M281 | M281 | Leaf |
| 0 | GRP_04 | GRP_06 | M284 | South American SR's children |
| 0 | GRP_04 | GRP_06 | M288 | South American SR's children |
| 1 | GRP_06 | M284 | M284 | Leaf |
| 1 | GRP_06 | M288 | M288 | Leaf |

This CTE hierarchy view is then joined in the main query to identify members specified in groups, and to evaluate their cell totals in a pure standard SQL using a SQL GROUP BY statement. If there is not a measure in the query, then it is not necessary to add records for every employee/group relationship in the CTE hierarchy view.

Figure 7:
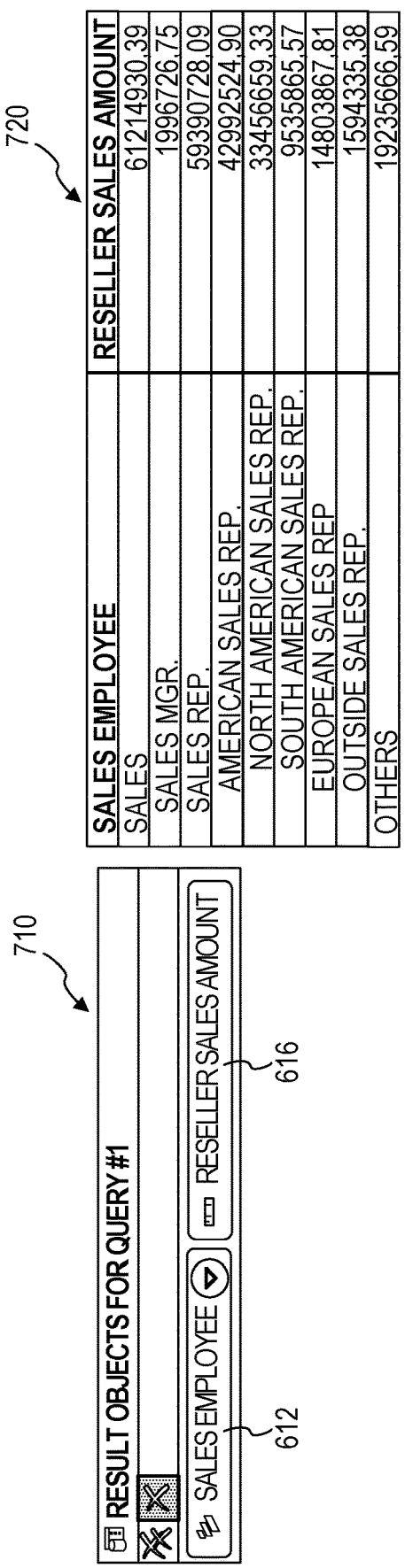
FIG. 7 illustrates a query panel and a query result generated using a hierarchy object, in accordance with some example embodiments.

The two use cases below describe SQL examples generated by the semantic layer to run a query containing the Sales Employee hierarchy used as result object on the top of an Oracle 12g database. In this example, we assume that the member names guarantee the member uniqueness. A first use case may involve a query without member selection on the hierarchy. In this first use case, the query returns the Sales Amount through the Sales Employee hierarchy without defining an explicit member selection, as shown in FIG. 7. FIG. 7 illustrates a query panel 710 in which a hierarchy object 612 and a measure 616 are indicated and a query result 720 generated using the hierarchy object 612 and the measure 616, in accordance with some example embodiments.

The following SQL script may be generated for the first use case:

Generated SQL Script

WITH
/* 1—Define Groups and record all their child members, regardless of depth */
GRP_08 AS (SELECT EMPLOYEEKEY FROM EMPLOYEE WHERE FULLNAME IN ('Syed E. Abbas', 'Lynn N. Tsoflias')),
GRP_07 AS (SELECT EMPLOYEEKEY FROM EMPLOYEE WHERE DEPARTMENT='Sales' AND TITLE NOT LIKE '%Manager%' AND SALESTERRITORY='Europe'),
GRP_06 AS (SELECT EMPLOYEEKEY FROM EMPLOYEE WHERE DEPARTMENT='Sales' AND TITLE NOT LIKE '%Manager%' AND SALESTERRITORY='South America'),
GRP_05 AS (SELECT EMPLOYEEKEY FROM EMPLOYEE WHERE DEPARTMENT='Sales' AND TITLE NOT LIKE '%Manager%' AND SALESTERRITORY='North America'),
GRP_04 AS (SELECT EMPLOYEEKEY FROM GRP_05 UNION SELECT EMPLOYEEKEY FROM GRP_06),
GRP_03 AS (SELECT EMPLOYEEKEY FROM GRP_04 UNION SELECT EMPLOYEEKEY FROM GRP_07 UNION SELECT EMPLOYEEKEY FROM GRP_08),
GRP_02 AS (SELECT EMPLOYEEKEY FROM EMPLOYEE WHERE DEPARTMENT='Sales' AND TITLE LIKE '%Manager%'), GRP_01 AS (SELECT EMPLOYEEKEY FROM GRP_02 UNION SELECT EMPLOYEEKEY FROM GRP_03),
GRP_NA AS (SELECT EMPLOYEEKEY FROM EMPLOYEE MINUS SELECT EMPLOYEEKEY FROM GRP_01),
/* 2—Create a CTE hierarchy view with group nodes, and include employee/group relationships to evaluate totals for groups */
CTE_HIER_VIEW AS (
SELECT 0 AS DEPTH, 0 AS IS_LEAF,-1 AS PARENT_NODE, 1 AS NODE, EMPLOYEEKEY AS CHILDREN FROM GRP_01 UNION ALL
SELECT 1 AS DEPTH, 0 AS IS_LEAF, 1 AS PARENT_NODE, 2 AS NODE, EMPLOYEEKEY AS CHILDREN FROM GRP_02 UNION ALL
SELECT 1 AS DEPTH, 0 AS IS_LEAF, 1 AS PARENT_NODE, 3 AS NODE, EMPLOYEEKEY AS CHILDREN FROM GRP_03 UNION ALL
SELECT 2 AS DEPTH, 0 AS IS_LEAF, 3 AS PARENT_NODE, 4 AS NODE, EMPLOYEEKEY AS CHILDREN FROM GRP_04 UNION ALL
SELECT 3 AS DEPTH, 0 AS IS_LEAF, 4 AS PARENT_NODE, 5 AS NODE, EMPLOYEEKEY AS CHILDREN FROM GRP_05 UNION ALL
SELECT 3 AS DEPTH, 0 AS IS_LEAF, 4 AS PARENT_NODE, 6 AS NODE, EMPLOYEEKEY AS CHILDREN FROM GRP_06 UNION ALL
SELECT 2 AS DEPTH, 0 AS IS_LEAF, 3 AS PARENT_NODE, 7 AS NODE, EMPLOYEEKEY AS CHILDREN FROM GRP_07 UNION ALL
SELECT 2 AS DEPTH, 0 AS IS_LEAF, 3 AS PARENT_NODE, 8 AS NODE, EMPLOYEEKEY AS CHILDREN FROM GRP_08 UNION ALL
SELECT 0 AS DEPTH, 0 AS IS_LEAF,-1 AS PARENT_NODE, 0 AS NODE, EMPLOYEEKEY AS CHILDREN FROM GRP_NA
)
/* 3—Main query */
SELECT
   CTE_HIER_VIEW.DEPTH AS H1_MEMBER_DEPTH,
   CTE_HIER_VIEW.PARENT_NODE AS H1_MEMBER_PARENT,
   CTE_HIER_VIEW.NODE AS H1_MEMBER_KEY,
   max(CASE CTE_HIER_VIEW.IS_LEAF
   WHEN 1 THEN Table_4.FULLNAME
   ELSE
     CASE CTE_HIER_VIEW.NODE
       WHEN 0 THEN 'Others'
       WHEN 1 THEN 'Sales'
       WHEN 2 THEN 'Sales Mgr.'
       WHEN 3 THEN 'Sales Rep.'
       WHEN 4 THEN 'American Sales Rep.'
       WHEN 5 THEN 'North American Sales Rep.'
       WHEN 6 THEN 'South American Sales Rep.'
       WHEN 7 THEN 'European Sales Rep.'
       WHEN 8 THEN 'Outside Sales Rep.'
       ELSE null
     END
   END) AS H1_MEMBER_CAPTION,
   sum(Table_1.SALESAMOUNT) AS "Reseller Sales Amount",
   sum(Table_1.ORDERQUANTITY) AS "Reseller Order Quantity"
FROM
   CTE_HIER_VIEW INNER JOIN EMPLOYEE Table_4 ON
(CTE_HIER_VIEW.CHILDREN=Table_4.EMPLOYEEKEY) INNER JOIN "FactResellerSales" Table_1 ON (Table_4.EMPLOYEEKEY=Table_1.EMPLOYEEKEY)
GROUP BY
   CTE_HIER_VIEW.DEPTH,
   CTE_HIER_VIEW.PARENT_NODE,
   CTE_HIER_VIEW.NODE A second use case may involve a query returning all members of the hierarchy. In this second use case, the query returns the Sales Amount for all members (including group nodes with their totals) of Sales Employee hierarchy as shown in FIG. 8. FIG. 8 illustrates a query panel 810 in which a hierarchy object 612, a hierarchy member selection 813 for the hierarchy object 612, and a measure 616 are indicated and a query result 820 generated using the hierarchy object 612, the hierarchy member selection 813, and the measure 616, in accordance with some example embodiments.

The following SQL script may be generated for the second use case:

Generated SQL Script

WITH
/* 1—Define Groups and record all their child members, regardless of depth */
GRP_08 AS (SELECT EMPLOYEEKEY FROM EMPLOYEE WHERE FULLNAME IN ('Syed E. Abbas', 'Lynn N. Tsoflias')),
GRP_07 AS (SELECT EMPLOYEEKEY FROM EMPLOYEE WHERE DEPARTMENT='Sales' AND TITLE NOT LIKE '%Manager%' AND SALESTERRITORY='Europe'),
GRP_06 AS (SELECT EMPLOYEEKEY FROM EMPLOYEE WHERE DEPARTMENT='Sales' AND TITLE NOT LIKE '%Manager%' AND SALESTERRITORY='South America'),
GRP_05 AS (SELECT EMPLOYEEKEY FROM EMPLOYEE WHERE DEPARTMENT='Sales' AND TITLE NOT LIKE '%Manager%' AND SALESTERRITORY='North America'),
GRP_04 AS (SELECT EMPLOYEEKEY FROM GRP_05 UNION SELECT EMPLOYEEKEY FROM GRP_06),
GRP_03 AS (SELECT EMPLOYEEKEY FROM GRP_04 UNION SELECT EMPLOYEEKEY FROM GRP_07 UNION SELECT EMPLOYEEKEY FROM GRP_08),
GRP_02 AS (SELECT EMPLOYEEKEY FROM EMPLOYEE WHERE DEPARTMENT='Sales' AND TITLE LIKE '%Manager%'),
GRP_01 AS (SELECT EMPLOYEEKEY FROM GRP_02 UNION SELECT EMPLOYEEKEY FROM GRP_03),
GRP_NA AS (SELECT EMPLOYEEKEY FROM EMPLOYEE MINUS SELECT EMPLOYEEKEY FROM GRP_01),
/* 2—Create a CTE hierarchy view with group nodes & their child members, and include employee/group relationships for group totals */
CTE_HIER_VIEW AS (
SELECT 0 AS DEPTH, 0 AS IS_LEAF,-1 AS PARENT_NODE, 1 AS NODE, EMPLOYEEKEY AS CHILDREN FROM GRP_01 UNION ALL
SELECT 1 AS DEPTH, 0 AS IS_LEAF, 1 AS PARENT_NODE, 2 AS NODE, EMPLOYEEKEY AS CHILDREN FROM GRP_02 UNION ALL

```
SELECT 2 AS DEPTH, 1 AS IS_LEAF, 2 AS
PARENT_NODE, EMPLOYEEKEY AS NODE,
EMPLOYEEKEY AS CHILDREN FROM GRP_02
UNION ALL
SELECT 1 AS DEPTH, 0 AS IS_LEAF, 1 AS
PARENT_NODE, 3 AS NODE, EMPLOYEEKEY AS
CHILDREN FROM GRP_03 UNION ALL
SELECT 2 AS DEPTH, 0 AS IS_LEAF, 3 AS
PARENT_NODE, 4 AS NODE, EMPLOYEEKEY AS
CHILDREN FROM GRP_04 UNION ALL
SELECT 3 AS DEPTH, 0 AS IS_LEAF, 4 AS
PARENT_NODE, 5 AS NODE, EMPLOYEEKEY AS
CHILDREN FROM GRP_05 UNION ALL
SELECT 4 AS DEPTH, 1 AS IS_LEAF, 5 AS
PARENT_NODE, EMPLOYEEKEY AS NODE,
EMPLOYEEKEY AS CHILDREN FROM GRP_05
UNION ALL
SELECT 3 AS DEPTH, 0 AS IS_LEAF, 4 AS
PARENT_NODE, 6 AS NODE, EMPLOYEEKEY AS
CHILDREN FROM GRP_06 UNION ALL
SELECT 4 AS DEPTH, 1 AS IS_LEAF, 6 AS
PARENT_NODE, EMPLOYEEKEY AS NODE,
EMPLOYEEKEY AS CHILDREN FROM GRP_06
UNION ALL
SELECT 2 AS DEPTH, 0 AS IS_LEAF, 3 AS
PARENT_NODE, 7 AS NODE, EMPLOYEEKEY AS
CHILDREN FROM GRP_07 UNION ALL
SELECT 3 AS DEPTH, 1 AS IS_LEAF, 7 AS
PARENT_NODE, EMPLOYEEKEY AS NODE,
EMPLOYEEKEY AS CHILDREN FROM GRP_07
UNION ALL
SELECT 2 AS DEPTH, 0 AS IS_LEAF, 3 AS
PARENT_NODE, 8 AS NODE, EMPLOYEEKEY AS
CHILDREN FROM GRP_08 UNION ALL
SELECT 3 AS DEPTH, 1 AS IS_LEAF, 8 AS
PARENT_NODE, EMPLOYEEKEY AS NODE,
EMPLOYEEKEY AS CHILDREN FROM GRP_08
UNION ALL
SELECT 0 AS DEPTH, 0 AS IS_LEAF,-1 AS
PARENT_NODE, 0 AS NODE, EMPLOYEEKEY AS
CHILDREN FROM GRP_NA UNION ALL
SELECT 1 AS DEPTH, 1 AS IS_LEAF, 0 AS
PARENT_NODE, EMPLOYEEKEY AS NODE,
EMPLOYEEKEY AS CHILDREN FROM GRP_NA
)
/* 3—Main query */
SELECT
    CTE_HIER_VIEW.DEPTH AS H1_MEMBER_DEPTH,
    CTE_HIER_VIEW.PARENT_NODE AS
H1_MEMBER_PARENT,
    CTE_HIER_VIEW.NODE AS H1_MEMBER_KEY,
    max(CASE CTE_HIER_VIEW.IS_LEAF
    WHEN 1 THEN Table_4.FULLNAME
    ELSE
        CASE CTE_HIER_VIEW.NODE
            WHEN 0 THEN 'Others'
            WHEN 1 THEN 'Sales'
            WHEN 2 THEN 'Sales Mgr.'
            WHEN 3 THEN 'Sales Rep.'
            WHEN 4 THEN 'American Sales Rep.'
            WHEN 5 THEN 'North American Sales Rep.'
            WHEN 6 THEN 'South American Sales Rep.'
            WHEN 7 THEN 'European Sales Rep.'
            WHEN 8 THEN 'Other Sales Rep.'
            ELSE null
        END
    END) AS H1_MEMBER_CAPTION,
    sum(Table_1.SALESAMOUNT) AS "Reseller Sales Amount",
    sum(Table_1.ORDERQUANTITY) AS "Reseller Order Quantity"
FROM
    CTE_HIER_VIEW INNER JOIN EMPLOYEE Table_4
ON
    (CTE_HIER_VIEW.CHILDREN=Table_4.EMPLOYEEKEY) INNER JOIN "FactResellerSales" Table_1 ON
    (Table_4.EMPLOYEEKEY=Table_1.EMPLOYEEKEY)
GROUP BY
    CTE_HIER_VIEW.DEPTH,
    CTE_HIER_VIEW.PARENT_NODE,
    CTE_HIER_VIEW.NODE
```

A query can contain multiple hierarchies $\{H_1, H_2 \ldots H_m\}$ with different nested groups. In this case, the semantic layer may generate a CTE hierarchy view for each hierarchy, and each CTE hierarchy view may be joined to its associated dimension table to run the main query. When a hierarchy is used as result object, the semantic layer may return all hierarchy members in the query result. However, to restrict the scope of hierarchy members in the final report, a user can define a hierarchy member selection on the top of the hierarchy used as result object in the query panel. In the semantic layer model, a hierarchy member selection is a collection of member set expressions. When using a member selection tool (e.g., available in the query panel) on a hierarchy, the user can:

1. select explicitly one or more members (or group nodes) at any depth of the hierarchy;
2. select implicitly member sets in using the following member relationship functions based on a given member:

| Member relationship function | Description |
| --- | --- |
| Self | Selects only the supplied member. |
| Children | Selects children for the supplied member. |
| Descendants | Selects all descendants of the supplied member. |

3. exclude one or more members (or group nodes) from the member selection.

In some example embodiments, the enterprise application platform 112 provides solutions to support hierarchy member selections defined on the top of hierarchies in the query panel. For this purpose, the principle consists in only restricting the CTE hierarchy view with additional filter conditions on the groups impacted by hierarchy member selections. For instance, for a member selection such as {American Sales Rep., Children of American Sales Rep., Children of North American Sales Rep., excluding Linda C. Mitchell and Michael G. Blythe}, only the American Sales Rep., North American Sales Rep., and South American Sales Rep. groups will be involved in the CTE hierarchy view with additional filter conditions defined according to member set expressions.

In the semantic layer model, the hierarchy member selection restricts the scope of hierarchy members in the final report, but it does not change the cell totals. For this reason, the CTE hierarchy view is still correlated with employee/group relationships to evaluate the cell totals in the SQL.

Figure 9:
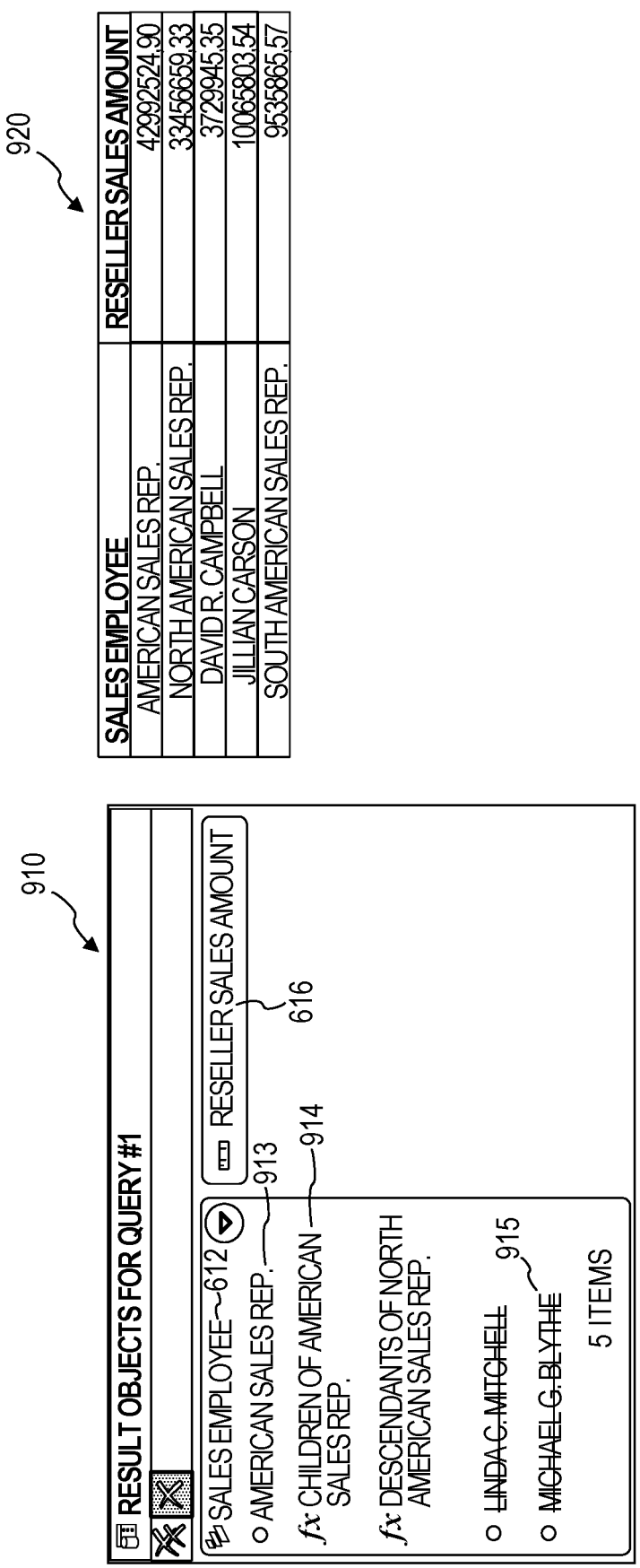
FIG. 9 illustrates a query panel and a query result generated using a hierarchy object, in accordance with some example embodiments.

FIG. 9 illustrates a query panel 910 in which a hierarchy object 612, hierarchy member selections 913, 914, and 915, and a measure 616 are indicated and a query result 920 generated using the hierarchy object 612, the hierarchy member selections 913, 914, and 915, and the measure 616, in accordance with some example embodiments. The table below describes the SQL example generated by the Universe Semantic layer for a query returning the Sales Amount for American Sales Rep., Children of American Sales Rep., Descendants of North American Sales Rep., excluding Linda C. Mitchell and Michael G. Blythe, as shown in FIG. 9:

Generated SQL Script

```
WITH
/* 1—Define Groups and record all their child members,
regardless of depth */
GRP_06 AS (SELECT EMPLOYEEKEY FROM
EMPLOYEE WHERE DEPARTMENT='Sales' AND
TITLE NOT LIKE '%Manager%' AND
SALESTERRITORY='South America'),
GRP_05 AS (SELECT EMPLOYEEKEY FROM
EMPLOYEE WHERE DEPARTMENT='Sales' AND
TITLE NOT LIKE '%Manager%' AND
SALESTERRITORY='North America'),
GRP_04 AS (SELECT EMPLOYEEKEY FROM GRP_05
UNION SELECT EMPLOYEEKEY FROM GRP_06),
/* 2—Create a CTE hierarchy view with group nodes and
members according to the member selection, and include
employee/group relationships for group totals */
CTE_HIER_VIEW AS(
SELECT 2 AS DEPTH, 0 AS IS_LEAF, 3 AS
PARENT_NODE, 4 AS NODE, EMPLOYEEKEY AS
CHILDREN FROM GRP_04 UNION ALL
SELECT 3 AS DEPTH, 0 AS IS_LEAF, 4 AS
PARENT_NODE, 5 AS NODE, EMPLOYEEKEY AS
CHILDREN FROM GRP_05 UNION ALL
SELECT 3 AS DEPTH, 0 AS IS_LEAF, 4 AS
PARENT_NODE, 6 AS NODE, EMPLOYEEKEY AS
CHILDREN FROM GRP_06 UNION ALL
SELECT 4 AS DEPTH, 1 AS IS_LEAF, 5 AS
PARENT_NODE, EMPLOYEEKEY AS NODE,
EMPLOYEEKEY AS CHILDREN FROM
GRP_05
/* add a filter condition excluding Linda C. Mitchell and
Michael G. Blythe */WHERE EMPLOYEEKEY NOT IN
(281,282)
)
/* 3—Main query */
SELECT
  CTE_HIER_VIEW.DEPTH AS H1_MEMBER_DEPTH,
  CTE_HIER_VIEW.PARENT_NODE AS
H1_MEMBER_PARENT,
  CTE_HIER_VIEW.NODE AS H1_MEMBER_KEY,
  max(CASE CTE_HIER_VIEW.IS_LEAF
  WHEN 1 THEN Table_4.FULLNAME
  ELSE
    CASE CTE_HIER_VIEW.NODE
      WHEN 4 THEN 'American Sales Rep.'
      WHEN 5 THEN 'North American Sales Rep.'
      WHEN 6 THEN 'South American Sales Rep.'
      ELSE null
    END
  END) AS H1_MEMBER_CAPTION,
  sum(Table_1.SALESAMOUNT) AS "Reseller Sales
Amount",
  sum(Table_1.ORDERQUANTITY) AS "Reseller Order
Quantity"
FROM
  CTE_HIER_VIEW INNER JOIN EMPLOYEE Table__4
ON
  (CTE_HIER_VIEW.CHILDREN=Table_4.
EMPLOYEEKEY) INNER JOIN "FactResellerSales"
Table__1 ON
  (Table_4.EMPLOYEEKEY=Table__1.EMPLOYEEKEY)
GROUP BY
  CTE_HIER_VIEW.DEPTH,
  CTE_HIER_VIEW.PARENT_NODE,
  CTE_HIER_VIEW.NODE
```

Figure 10:
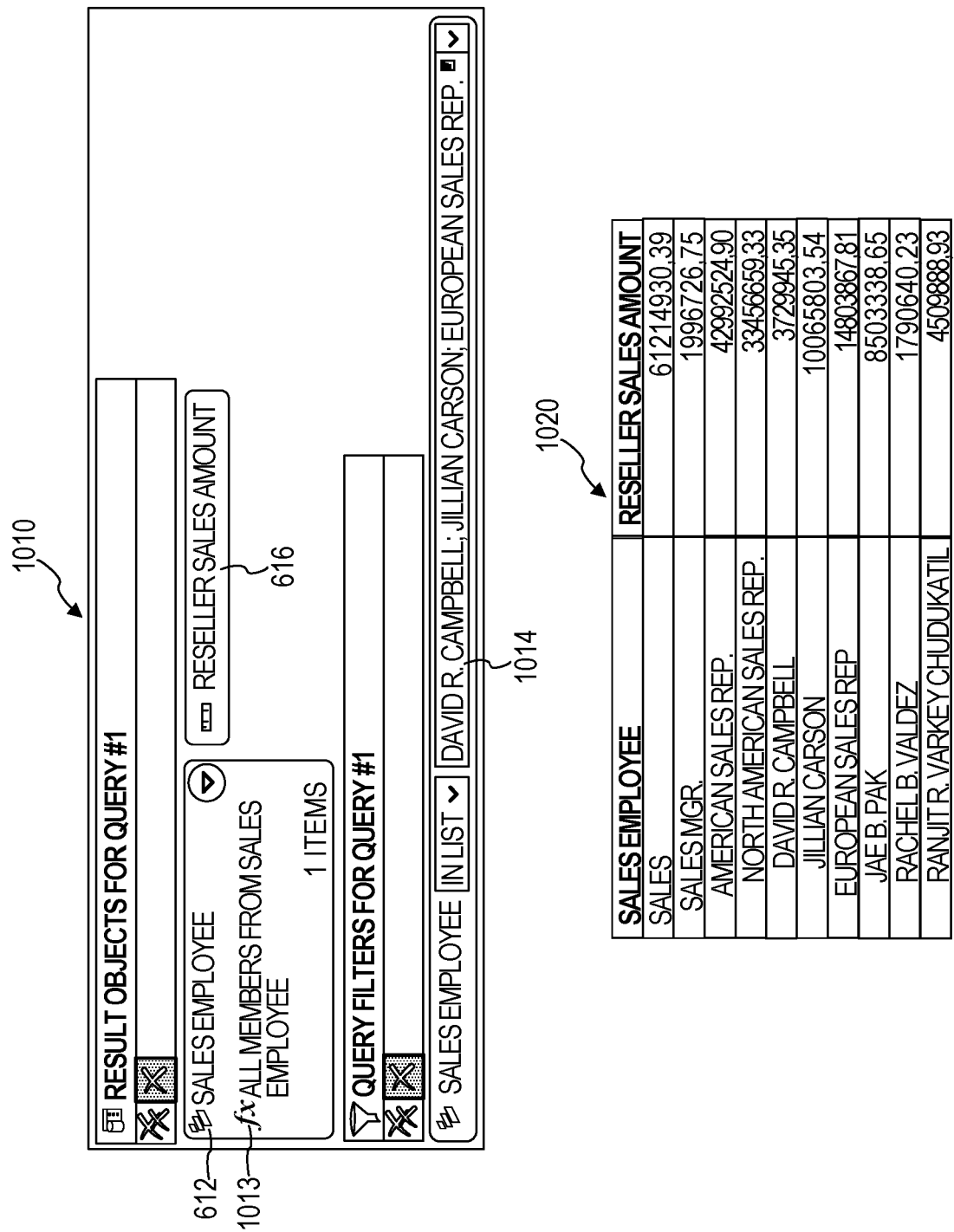
FIG. 10 illustrates a query panel and a query result generated using a hierarchy object, in accordance with some example embodiments.

Hierarchies can be also used as query filters in the query panel. Contrary to the hierarchy member selections in the query panel, query filters restrict both the global scope of hierarchy members and the aggregations of cell totals, which means that the global member scope and measure aggregation will be limited to filtered members with their descendants. FIG. 10 illustrates a query panel 1010 and a query result 1020 generated using a hierarchy object 612 and a measure 616 indicated in the query panel 1010, in accordance with some example embodiments. The query panel 1010 also indicates a hierarchy member selection 1013 for the hierarchy object 612. Additionally, the query panel 1010 indicates query filters 1014 specified by the user.

The table below describes the SQL example generated by the semantic layer for a query returning the Sales Amount produced by members of European Sales Rep., and Jillian Carson and David R. Campbell (belonging to American Sales Rep.>North American Sales Rep. group) through the whole Sales Employee hierarchy, as shown in FIG. 10:

Generated SQL Script

```
WITH
/* 1—Define Groups and record all their child members,
regardless of depth */
GRP_08 AS (SELECT EMPLOYEEKEY FROM
EMPLOYEE WHERE FULLNAME IN ('Syed E. Abbas',
'Lynn N. Tsoflias')),
GRP_07 AS (SELECT EMPLOYEEKEY FROM
EMPLOYEE WHERE DEPARTMENT='Sales' AND
TITLE NOT LIKE '%Manager%' AND
SALESTERRITORY='Europe'),
GRP_06 AS (SELECT EMPLOYEEKEY FROM
EMPLOYEE WHERE DEPARTMENT='Sales' AND
TITLE NOT LIKE '%Manager%' AND
SALESTERRITORY='South America'),
GRP_05 AS (SELECT EMPLOYEEKEY FROM
EMPLOYEE WHERE DEPARTMENT='Sales' AND
TITLE NOT LIKE '%Manager%' AND
SALESTERRITORY='North America'),
GRP_04 AS (SELECT EMPLOYEEKEY FROM GRP_05
UNION SELECT EMPLOYEEKEY FROM GRP_06),
GRP_03 AS (SELECT EMPLOYEEKEY FROM GRP_04
UNION SELECT EMPLOYEEKEY FROM GRP_07
UNION SELECT EMPLOYEEKEY FROM GRP_08),
GRP_02 AS (SELECT EMPLOYEEKEY FROM
EMPLOYEE WHERE DEPARTMENT='Sales' AND
TITLE LIKE '%Manager%'),
GRP_01 AS (SELECT EMPLOYEEKEY FROM GRP_02
UNION SELECT EMPLOYEEKEY FROM GRP_03),
GRP_NA AS (SELECT EMPLOYEEKEY FROM
EMPLOYEE MINUS SELECT EMPLOYEEKEY FROM
GRP_01),
```

/* 2—Create a CTE hierarchy view with group nodes & their child members, and include employee/group relationships for group totals */
CTE_HIER_VIEW AS (
SELECT 0 AS DEPTH, 0 AS IS_LEAF,-1 AS PARENT_NODE, 1 AS NODE, EMPLOYEEKEY AS CHILDREN FROM GRP_01 UNION ALL
SELECT 1 AS DEPTH, 0 AS IS_LEAF, 1 AS PARENT_NODE, 2 AS NODE, EMPLOYEEKEY AS CHILDREN FROM GRP_02 UNION ALL
SELECT 2 AS DEPTH, 1 AS IS_LEAF, 2 AS PARENT_NODE, EMPLOYEEKEY AS NODE, EMPLOYEEKEY AS CHILDREN FROM GRP_02 UNION ALL
SELECT 1 AS DEPTH, 0 AS IS_LEAF, 1 AS PARENT_NODE, 3 AS NODE, EMPLOYEEKEY AS CHILDREN FROM GRP_03 UNION ALL
SELECT 2 AS DEPTH, 0 AS IS_LEAF, 3 AS PARENT_NODE, 4 AS NODE, EMPLOYEEKEY AS CHILDREN FROM GRP_04 UNION ALL
SELECT 3 AS DEPTH, 0 AS IS_LEAF, 4 AS PARENT_NODE, 5 AS NODE, EMPLOYEEKEY AS CHILDREN FROM GRP_05 UNION ALL
SELECT 4 AS DEPTH, 1 AS IS_LEAF, 5 AS PARENT_NODE, EMPLOYEEKEY AS NODE, EMPLOYEEKEY AS CHILDREN FROM GRP_05 UNION ALL
SELECT 3 AS DEPTH, 0 AS IS_LEAF, 4 AS PARENT_NODE, 6 AS NODE, EMPLOYEEKEY AS CHILDREN FROM GRP_06 UNION ALL
SELECT 4 AS DEPTH, 1 AS IS_LEAF, 6 AS PARENT_NODE, EMPLOYEEKEY AS NODE, EMPLOYEEKEY AS CHILDREN FROM GRP_06 UNION ALL
SELECT 2 AS DEPTH, 0 AS IS_LEAF, 3 AS PARENT_NODE, 7 AS NODE, EMPLOYEEKEY AS CHILDREN FROM GRP_07 UNION ALL
SELECT 3 AS DEPTH, 1 AS IS_LEAF, 7 AS PARENT_NODE, EMPLOYEEKEY AS NODE, EMPLOYEEKEY AS CHILDREN FROM GRP_07 UNION ALL
SELECT 2 AS DEPTH, 0 AS IS_LEAF, 3 AS PARENT_NODE, 8 AS NODE, EMPLOYEEKEY AS CHILDREN FROM GRP_08 UNION ALL
SELECT 3 AS DEPTH, 1 AS IS_LEAF, 8 AS PARENT_NODE, EMPLOYEEKEY AS NODE, EMPLOYEEKEY AS CHILDREN FROM GRP_08 UNION ALL
SELECT 0 AS DEPTH, 0 AS IS_LEAF,-1 AS PARENT_NODE, 0 AS NODE, EMPLOYEEKEY AS CHILDREN FROM GRP_NA UNION ALL
SELECT 1 AS DEPTH, 1 AS IS_LEAF, 0 AS PARENT_NODE, EMPLOYEEKEY AS NODE, EMPLOYEEKEY AS CHILDREN FROM GRP_NA
)
/* 3—Main query */
SELECT
    CTE_HIER_VIEW.DEPTH AS H1_MEMBER_DEPTH,
    CTE_HIER_VIEW.PARENT_NODE AS H1_MEMBER_PARENT,
    CTE_HIER_VIEW.NODE AS H1_MEMBER_KEY,
    max(CASE CTE_HIER_VIEW.IS_LEAF
    WHEN 1 THEN Table_4.FULLNAME
    ELSE
        CASE CTE_HIER_VIEW.NODE
        WHEN 0 THEN 'Others'
        WHEN 1 THEN 'Sales'
        WHEN 2 THEN 'Sales Mgr.'
        WHEN 3 THEN 'Sales Rep.'
        WHEN 4 THEN 'American Sales Rep.'
        WHEN 5 THEN 'North American Sales Rep.'
        WHEN 6 THEN 'South American Sales Rep.'
        WHEN 7 THEN 'European Sales Rep.'
        WHEN 8 THEN 'Other Sales Rep.'
        ELSE null
        END
    END) AS H1_MEMBER_CAPTION,
    sum(Table_1.SALESAMOUNT) AS "Reseller Sales Amount",
    sum(Table_1.ORDERQUANTITY) AS "Reseller Order Quantity"
FROM
    CTE_HIER_VIEW INNER JOIN EMPLOYEE Table__4 ON
    (CTE_HIER_VIEW.CHILDREN=Table_4.EMPLOYEEKEY) INNER JOIN "FactResellerSales" Table__1 ON
    (Table_4.EMPLOYEEKEY=Table__1.EMPLOYEEKEY)
WHERE
    /* add global hierarchy filter conditions on members of European Sales Rep., and Jillian Carson and David R. Campbell */
    CTE_HIER_VIEW.CHILDREN IN (283,289)
    OR
    CTE_HIER_VIEW.CHILDREN IN (SELECT EMPLOYEEKEY FROM
    GRP_07)
GROUP BY
    CTE_HIER_VIEW.DEPTH,
    CTE_HIER_VIEW.PARENT_NODE,
    CTE_HIER_VIEW.NODE The enterprise application platform 112 also supports hierarchies created on the top of universes 324 based on OLAP MDX data sources 350. To consume these hierarchies in the query panel, the semantic layer generates by default one MDX query per group, and it combines their results from local processing that completes data display according to hierarchy specifications. To support hierarchies on the top of OLAP MDX databases, the generated MDX queries use the standard MDX in defining MDX Named Sets and MDX Calculated Members in the MDX script in order to define groups and evaluate cell totals in using the MDX Aggregate function.

The table below describes the MDX example generated on the top of a Microsoft Analysis Services OLAP database by the Universe Semantic layer for a query returning the Sales Amount for American Sales Rep., Children of American Sales Rep., Children of North American Sales Rep., excluding Linda C. Mitchell and Michael G. Blythe, as shown in FIG. 9:

Generated MDX Script

WITH
// 1—Define Named Sets for each group with their child members, regardless of depth
SET [GRP_06] AS '{Filter([Employee].[Employee].[Employee].Members, ([Employee].[Employee].CurrentMember.Properties("Department")="Sales") AND (InStr(1, [Employee].[Employee].CurrentMember.Properties("Title"), "Manager")=0) AND ([Employee].[Employee].CurrentMember.Properties("SalesTerritory")="South America"))}'
SET [GRP_05] AS '{Filter([Employee].[Employee].[Employee].Members, ([Employee].[Employee].CurrentMember.Properties("Department")="Sales") AND (InStr(1, [Employee].[Employee].CurrentMember.Properties("Title"), "Manager")=0) AND ([Employee].[Employee].CurrentMember.Properties("SalesTerritory")="North America"))}'
SET [GRP_04] AS '{Union([GRP_05],[GRP_06])}'
//2—Define Calculated Members to evaluate group totals with the Aggregate function
MEMBER [Employee].[Employee].[South American Sales Rep.] AS Aggregate([GRP_06])
MEMBER [Employee].[Employee].[North American Sales Rep.] AS Aggregate([GRP_05])
MEMBER [Employee].[Employee].[American Sales Rep.] AS Aggregate([GRP_04])
/ 3—Define Named Sets to apply hierarchy member selection restrictions on impacted groups
SET [GRP_05_FILTERED] AS '(Filter(([GRP_05]), ([Employee].[Employee].CurrentMember.Properties("MEMBER_CAPTION")="Linda C. Mitchell") OR ([Employee].[Employee].CurrentMember.Properties("MEMBER_CAPTION")="Michael G. Blythe"))}'
// 4—Main query for the final report
SELECT
    NON EMPTY {[Measures].[Reseller Sales Amount], [Measures].[Reseller Order Quantity]} ON COLUMNS,
    NON EMPTY {[Employee].[Employee].[American Sales Rep.], [Employee].[Employee].[North American Sales Rep.], [GRP_05_FILTERED], [Employee].[Employee].[South American Sales Rep.]}
DIMENSION PROPERTIES PARENT_UNIQUE_NAME ON ROWS FROM [Reseller Sales]

Figure 11:
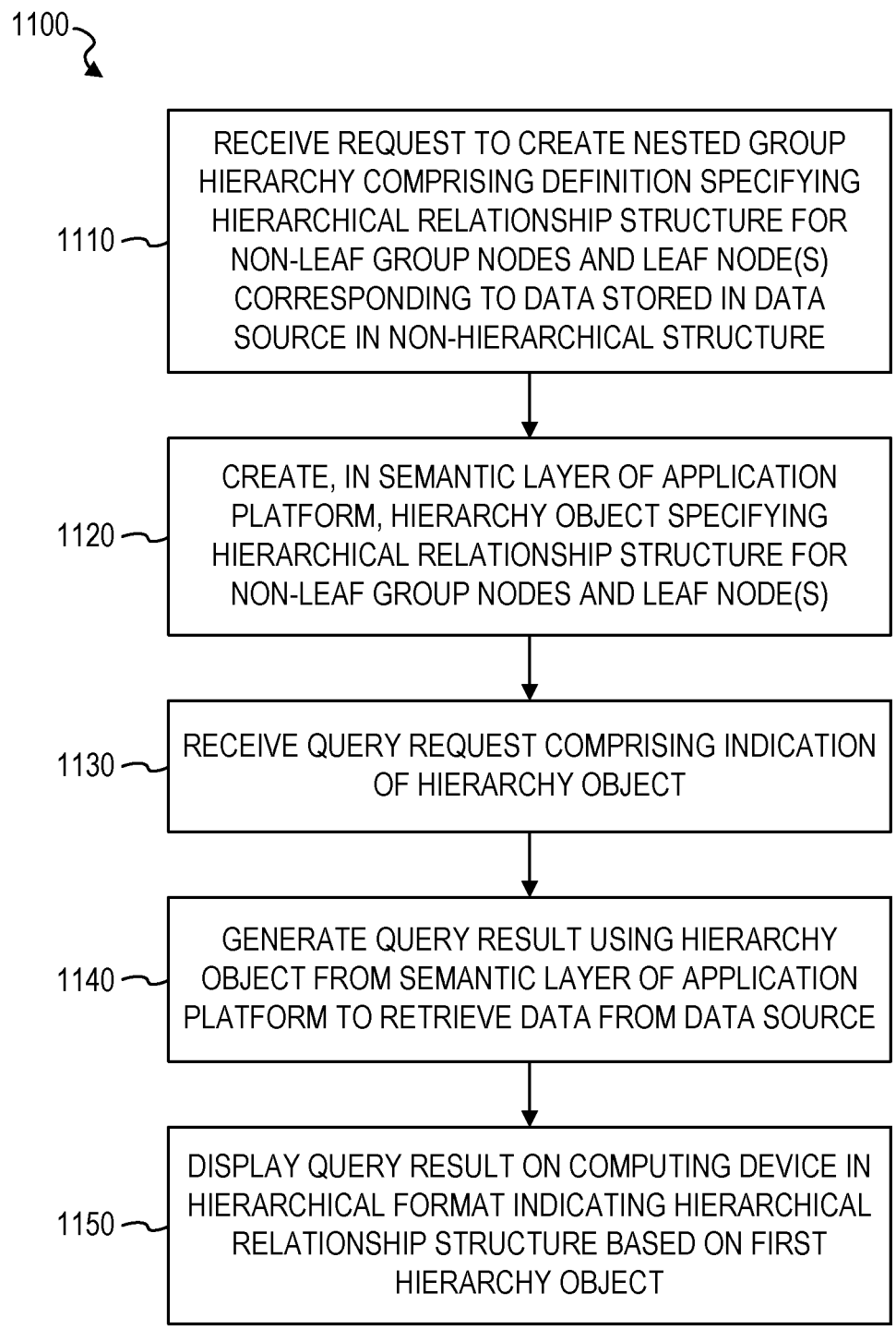
FIG. 11 is a flowchart illustrating a method of implementing nested group hierarchies for analytics and presentation, in accordance with some example embodiments.

FIG. 11 is a flowchart illustrating a method 1100 of implementing nested group hierarchies for analytics and presentation, in accordance with some example embodiments. The method 1100 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1100 are performed by the enterprise application platform 112 of FIG. 3, as described above.

At operation 1110, the enterprise application platform 112 receives a first request to create a first nested group hierarchy in a first data universe from a first computing device of a first user. In some example embodiments, the first request comprises a first definition for the first nested group hierarchy, where the first definition specifies a hierarchical relationship structure for a plurality of non-leaf group nodes and at least one leaf node. The plurality of non-leaf group nodes and the at least one leaf node may correspond to data stored in a data source in a non-hierarchical structure. In some example embodiments, the data source comprises a relational database. In other example embodiments, the data source comprises an online analytical processing (OLAP) cube comprising a multi-dimensional array of data. Other types of data sources are also within the scope of the present disclosure. The first definition may comprise at least one static member selection corresponding to the at least one leaf node, where the at least one static member selection identifies at least one specific member of one of the plurality of non-leaf group nodes. Additionally or alternatively, the first definition may comprise at least one dynamic member selection corresponding to the at least one leaf node, where the at least one dynamic member selection specifies at least one search criteria for identifying at least one specific member of one of the plurality of non-leaf group nodes.

Thereafter, the enterprise application platform 112 creates a first hierarchy object in a semantic layer of an application platform based on the first request, at operation 1120. In some example embodiments, the first hierarchy object specifies the hierarchical relationship structure for the plurality of non-leaf group nodes and the at least one leaf node based on the first definition.

At operation 1130, the enterprise application platform 112 receives a second request to query the data source from a second computing device of a second user. In some example embodiments, the second request comprises an indication of the first hierarchy object.

Next, the enterprise application platform 112 generates a query result based on the second request using the first hierarchy object from the semantic layer of the application platform to retrieve the data from the data source, at operation 1140.

At operation 1150, the enterprise application platform 112 causes the query result to be displayed on the second computing device using the first hierarchy object. In some example embodiments, the retrieved data is displayed in a hierarchical format indicating the hierarchical relationship structure based on the first hierarchy object.

It is contemplated that any of the other features described within the present disclosure can be incorporated into the method 1100.

Figure 12:
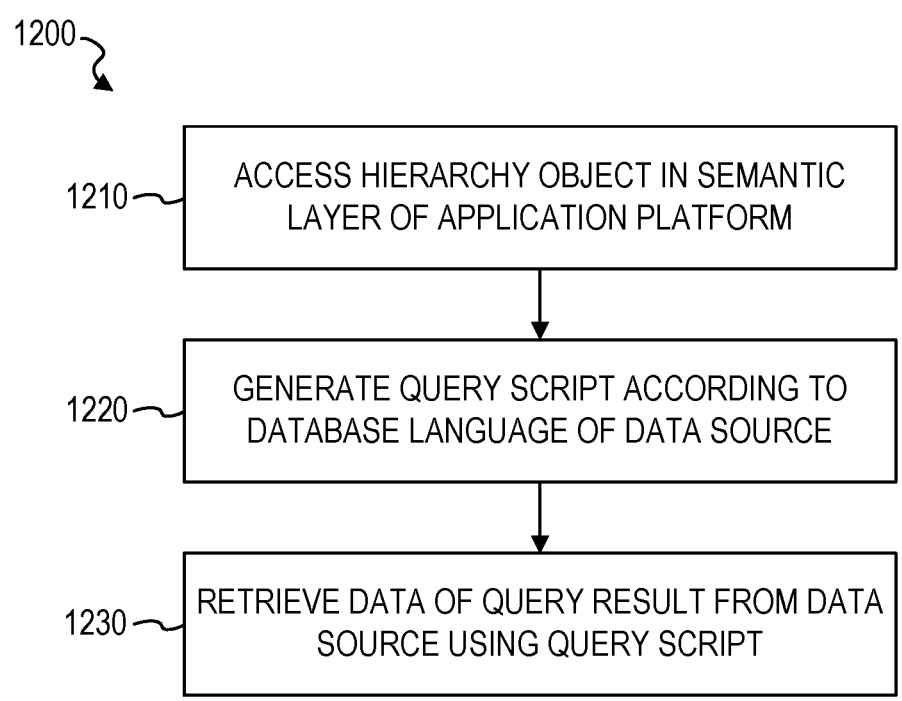
FIG. 12 is a flowchart illustrating a method of generating a query result using a hierarchy object, in accordance with some example embodiments.

FIG. 12 is a flowchart illustrating a method 1200 of generating a query result using a hierarchy object, in accordance with some example embodiments. The method 1200 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1200 are performed by the enterprise application platform 112 of FIG. 3, as described above. In some example embodiments, the method 1200 is performed as part of generating the query result at operation 1140 of the method 1100.

At operation 1210, the enterprise application platform 112 accesses the first hierarchy object in the semantic layer of the application platform. At operation 1220, the enterprise application platform 112 generates a query script according to a database language of the data source using the accessed first hierarchy object. In some example embodiments, the query script comprises a Structured Query Language (SQL) script or a Multidimensional Expressions (MDX) script. Other types of query scripts are also within the scope of the present disclosure. At operation 1230, the enterprise application platform 112 retrieves the data of the query result from the data source using the query script.

It is contemplated that any of the other features described within the present disclosure can be incorporated into the method 1200.

The following paragraphs provide example embodiments.

Example 1 includes a computer-implemented method comprising: receiving, by a computer system having at least one hardware processor, a first request to create a first nested group hierarchy in a first data universe from a first computing device of a first user, the first request comprising a first definition for the first nested group hierarchy, the first definition specifying a hierarchical relationship structure for a plurality of non-leaf group nodes and at least one leaf node, the plurality of non-leaf group nodes and the at least one leaf node corresponding to data stored in a data source in a non-hierarchical structure; creating, by the computer system, a first hierarchy object in a semantic layer of an application platform based on the first request, the first hierarchy object specifying the hierarchical relationship structure for the plurality of non-leaf group nodes and the at least one leaf node based on the first definition; receiving, by the computer system, a second request to query the data source from a second computing device of a second user, the second request comprising an indication of the first hierarchy object; generating, by the computer system, a query result based on the second request using the first hierarchy object from the semantic layer of the application platform to retrieve the data from the data source; and causing, by the computer system, the query result to be displayed on the second computing device using the first hierarchy object, the retrieved data being displayed in a hierarchical format indicating the hierarchical relationship structure based on the first hierarchy object.

Example 2 includes the computer-implemented method of example 1, wherein the data source comprises a relational database.

Example 3 includes the computer-implemented method of example 1 or example 2, wherein the data source comprises an online analytical processing (OLAP) cube comprising a multi-dimensional array of data.

Example 4 includes the computer-implemented method of any one of examples 1 to 3, wherein the first definition comprises at least one static member selection corresponding to the at least one leaf node, the at least one static member selection identifying at least one specific member of one of the plurality of non-leaf group nodes.

Example 5 includes the computer-implemented method of any one of examples 1 to 4, wherein the first definition comprises at least one dynamic member selection corresponding to the at least one leaf node, the at least one dynamic member selection specifying at least one search criteria for identifying at least one specific member of one of the plurality of non-leaf group nodes.

Example 6 includes the computer-implemented method of any one of examples 1 to 5, wherein the generating of the query result comprises: accessing the first hierarchy object in the semantic layer of the application platform; generating a query script according to a database language of the data source using the accessed first hierarchy object; and retrieving the data of the query result from the data source using the query script.

Example 7 includes the computer-implemented method of any one of examples 1 to 6, wherein the query script comprises a Structured Query Language (SQL) script or a Multidimensional Expressions (MDX) script.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 13:
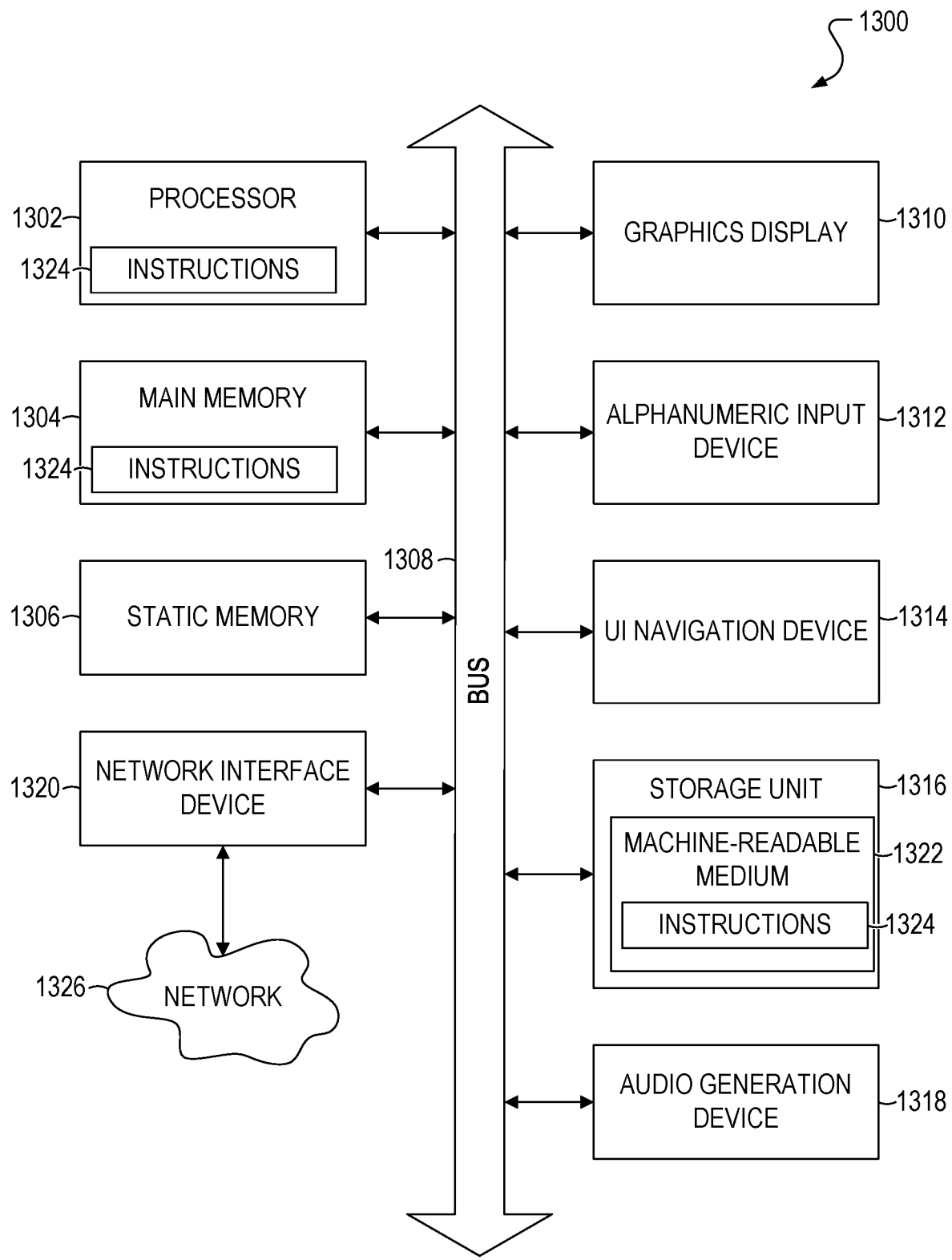
FIG. 13 is a block diagram of an example computer system on which methodologies described herein can be executed, in accordance with some example embodiments.

FIG. 13 is a block diagram of a machine in the example form of a computer system 1300 within which instructions 1324 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304, and a static memory 1306, which communicate with each other via a bus 1308. The computer system 1300 may further include a graphics or video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a storage unit (e.g., a disk drive unit) 1316, an audio or signal generation device 1318 (e.g., a speaker), and a network interface device 1320.

The storage unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
receiving, by a computer system having at least one hardware processor, a first request to create a first nested group hierarchy in a first data universe from a first computing device of a first user, the first request comprising a first definition for the first nested group hierarchy, the first definition specifying a hierarchical relationship structure for a plurality of non-leaf group nodes and at least one leaf node, the plurality of non-leaf group nodes and the at least one leaf node corresponding to data stored in a data source in a non-hierarchical structure, the first definition comprising at least one dynamic member selection corresponding to the at least one leaf node, the at least one dynamic member selection specifying at least one search criteria for identifying at least one specific member of one of the plurality of non-leaf group nodes, the at least one search criteria comprising a plurality of conditions that are required to be satisfied for inclusion in the one of the plurality of non-leaf group nodes;
creating, by the computer system, a first hierarchy object in a semantic layer of an application platform based on the first request, the first hierarchy object specifying the hierarchical relationship structure for the plurality of non-leaf group nodes and the at least one leaf node based on the first definition;
receiving, by the computer system, a second request to query the data source from a second computing device of a second user, the second request comprising an indication of the first hierarchy object;
generating, by the computer system, a query result based on the second request using the first hierarchy object from the semantic layer of the application platform to retrieve the data from the data source; and
causing, by the computer system, the query result to be displayed on the second computing device using the first hierarchy object, the retrieved data being displayed in a hierarchical format indicating the hierarchical relationship structure based on the first hierarchy object.

2. The computer-implemented method of claim 1, wherein the data source comprises a relational database.

3. The computer-implemented method of claim 1, wherein the data source comprises an online analytical processing (OLAP) cube comprising a multi-dimensional array of data.

4. The computer-implemented method of claim 1, wherein the first definition comprises at least one static member selection corresponding to the at least one leaf node, the at least one static member selection identifying at least one specific member of one of the plurality of non-leaf group nodes.

5. The computer-implemented method of claim 1, wherein the generating of the query result comprises:
accessing the first hierarchy object in the semantic layer of the application platform;
generating a query script according to a database language of the data source using the accessed first hierarchy object; and
retrieving the data of the query result from the data source using the query script.

6. The computer-implemented method of claim 5, wherein the query script comprises a Structured Query Language (SQL) script or a Multidimensional Expressions (MDX) script.

7. The computer-implemented method of claim 1, wherein the application platform comprises a plurality of applications, and the first hierarchy object is accessible for use by the plurality of applications.

8. A system comprising:
at least one hardware processor; and
a non-transitory computer-readable medium storing executable instructions that, when executed, cause the at least one processor to perform operations comprising:
receiving a first request to create a first nested group hierarchy in a first data universe from a first computing device of a first user, the first request comprising a first definition for the first nested group hierarchy, the first definition specifying a hierarchical relationship structure for a plurality of non-leaf group nodes and at least one leaf node, the plurality of non-leaf group nodes and the at least one leaf node corresponding to data stored in a data source in a non-hierarchical structure, the first definition comprising at least one dynamic member selection corresponding to the at least one leaf node, the at least one dynamic member selection specifying at least one search criteria for identifying at least one specific member of one of the plurality of non-leaf group nodes, the at least one search criteria comprising a plurality of conditions that are required to be satisfied for inclusion in the one of the plurality of non-leaf group nodes;
creating a first hierarchy object in a semantic layer of an application platform based on the first request, the first hierarchy object specifying the hierarchical relationship structure for the plurality of non-leaf group nodes and the at least one leaf node based on the first definition;
receiving a second request to query the data source from a second computing device of a second user, the second request comprising an indication of the first hierarchy object;
generating a query result based on the second request using the first hierarchy object from the semantic layer of the application platform to retrieve the data from the data source; and
causing the query result to be displayed on the second computing device using the first hierarchy object, the data of the query result being displayed in a hierarchical format indicating the hierarchical relationship structure based on the first hierarchy object.

9. The system of claim 8, wherein the data source comprises a relational database.

10. The system of claim 8, wherein the data source comprises an online analytical processing (OLAP) cube comprising a multi-dimensional array of data.

11. The system of claim 8, wherein the first definition comprises at least one static member selection corresponding to the at least one leaf node, the at least one static member selection identifying at least one specific member of one of the plurality of non-leaf group nodes.

12. The system of claim 8, wherein the generating of the query result comprises:
   accessing the first hierarchy object in the semantic layer of the application platform;
   generating a query script according to a database language of the data source using the accessed first hierarchy object; and
   retrieving the data of the query result from the data source using the query script.

13. The system of claim 12, wherein the query script comprises a Structured Query Language (SQL) script or a Multidimensional Expressions (MDX) script.

14. The system of claim 8, wherein the application platform comprises a plurality of applications, and the first hierarchy object is accessible for use by the plurality of applications.

15. A non-transitory machine-readable storage medium, tangibly embodying a set of instructions that, when executed by at least one hardware processor, causes the at least one processor to perform operations comprising:
   receiving a first request to create a first nested group hierarchy in a first data universe from a first computing device of a first user, the first request comprising a first definition for the first nested group hierarchy, the first definition specifying a hierarchical relationship structure for a plurality of non-leaf group nodes and at least one leaf node, the plurality of non-leaf group nodes and the at least one leaf node corresponding to data stored in a data source in a non-hierarchical structure, the first definition comprising at least one dynamic member selection corresponding to the at least one leaf node, the at least one dynamic member selection specifying at least one search criteria for identifying at least one specific member of one of the plurality of non-leaf group nodes, the at least one search criteria comprising a plurality of conditions that are required to be satisfied for inclusion in the one of the plurality of non-leaf group nodes;
   creating a first hierarchy object in a semantic layer of an application platform based on the first request, the first hierarchy object specifying the hierarchical relationship structure for the plurality of non-leaf group nodes and the at least one leaf node based on the first definition;
   receiving a second request to query the data source from a second computing device of a second user, the second request comprising an indication of the first hierarchy object;
   generating a query result based on the second request using the first hierarchy object from the semantic layer of the application platform to retrieve the data from the data source; and
   causing the query result to be displayed on the second computing device using the first hierarchy object, the data of the query result being displayed in a hierarchical format indicating the hierarchical relationship structure based on the first hierarchy object.

16. The non-transitory machine-readable storage medium of claim 15, wherein the data source comprises a relational database.

17. The non-transitory machine-readable storage medium of claim 15, wherein the data source comprises an online analytical processing (OLAP) cube comprising a multi-dimensional array of data.

18. The non-transitory machine-readable storage medium of claim 15, wherein the first definition comprises at least one static member selection corresponding to the at least one leaf node, the at least one static member selection identifying at least one specific member of one of the plurality of non-leaf group nodes.

19. The non-transitory machine-readable storage medium of claim 15, wherein the generating of the query result comprises:
   accessing the first hierarchy object in the semantic layer of the application platform;
   generating a query script according to a database language of the data source using the accessed first hierarchy object; and
   retrieving the data of the query result from the data source using the query script.

20. The non-transitory machine-readable storage medium of claim 15, wherein the application platform comprises a plurality of applications, and the first hierarchy object is accessible for use by the plurality of applications.

* * * * *